(12) United States Patent
Kraus et al.

(10) Patent No.: US 8,535,206 B2
(45) Date of Patent: Sep. 17, 2013

(54) MOBILE ELLIPTICALLY DRIVEN DEVICE AND STEERING MECHANISM

(75) Inventors: David Kraus, Fresno, CA (US); Dean Maro, Felton, CA (US)

(73) Assignee: HPN Holdings, Inc., Fresno, CA (US)

( * ) Notice: Subject to any disclaimer, the term of this patent is extended or adjusted under 35 U.S.C. 154(b) by 162 days.

(21) Appl. No.: 12/785,147

(22) Filed: May 21, 2010

(65) Prior Publication Data

US 2010/0230924 A1 Sep. 16, 2010

Related U.S. Application Data

(63) Continuation-in-part of application No. 11/173,213, filed on Jul. 1, 2005, now Pat. No. 7,803,090.

(60) Provisional application No. 61/225,776, filed on Jul. 15, 2009.

(51) Int. Cl.
*B62M 1/00* (2010.01)

(52) U.S. Cl.
USPC .......................... 482/57; 280/210; 280/86.754

(58) Field of Classification Search
USPC .................. 482/51, 52, 57, 62, 70; 280/220, 280/221, 224, 237, 244, 245, 252, 253, 256, 280/257, 258, 259, 266, 267, 269, 270, 279
See application file for complete search history.

(56) References Cited

U.S. PATENT DOCUMENTS

| | | | |
|---|---|---|---|
| 435,665 A | 9/1890 | Minnix | |
| 594,773 A | 11/1897 | Bartel | |
| 602,536 A | 4/1898 | Bassett | |
| 1,180,126 A | 4/1916 | Fullarton | |
| 1,397,174 A | 11/1921 | Morwood | |
| 1,398,883 A | 11/1921 | Mottlau | |
| 1,798,383 A | 3/1931 | Roberds | |
| 1,798,384 A | 3/1931 | Roberds | |
| 1,845,192 A | 2/1932 | Roberds | |
| 2,125,763 A | 8/1938 | Anderson | |
| 2,203,344 A * | 6/1940 | Tjaarda | 267/280 |
| 2,304,291 A * | 12/1942 | Wahlberg | 280/124.127 |
| 2,444,025 A * | 6/1948 | Austin | 280/93.507 |

(Continued)

FOREIGN PATENT DOCUMENTS

| | | |
|---|---|---|
| AT | 394694 | 5/1992 |
| DE | 195-02-630 | 7/1996 |

(Continued)

OTHER PUBLICATIONS

European Patent Office. Extended European Search Report. Oct. 19, 2009.

(Continued)

*Primary Examiner* — Stephen Crow

(74) *Attorney, Agent, or Firm* — Paul M. Sykes; Sradley Arant Boult Cummings LLP; Nicholas J. Landau

(57) ABSTRACT

A steering mechanism is provided that steers by imparting a variable amount of toe or camber to a wheel, and is capable of imparting both toe and camber using a single mechanism. Some versions of the steering mechanism can provide extremely high stability during turns controlled by the simple leaning of the operator. Vehicles using the mechanism are provided, including lean-steered vehicles, and including a three-wheeled mobile elliptically driven device.

26 Claims, 17 Drawing Sheets

(56) References Cited

U.S. PATENT DOCUMENTS

| | | | |
|---|---|---|---|
| 2,505,464 A | | 4/1950 | DeBuit |
| 2,684,253 A | * | 7/1954 | Leighton ................. 280/86.751 |
| 2,705,539 A | * | 4/1955 | Martin ......................... 180/254 |
| 2,793,874 A | * | 5/1957 | Helm et al. ............ 280/124.151 |
| 2,995,384 A | * | 8/1961 | Rich ............................ 280/269 |
| 3,181,883 A | * | 5/1965 | Kolbe ....................... 280/5.509 |
| 3,305,243 A | * | 2/1967 | Manfredi, Jr. et al. ........ 280/651 |
| 3,519,097 A | * | 7/1970 | Commons ..................... 180/212 |
| 3,746,118 A | | 7/1973 | Altorfer |
| 3,895,825 A | | 7/1975 | Sink |
| 4,451,064 A | | 5/1984 | Perkins |
| 4,456,277 A | * | 6/1984 | Carpenter ..................... 280/282 |
| 4,615,845 A | * | 10/1986 | Tahata ......................... 261/44.3 |
| 4,647,060 A | | 3/1987 | Tomkinson |
| 4,666,172 A | | 5/1987 | Hartmann |
| 4,693,487 A | * | 9/1987 | Cooper ................... 280/86.751 |
| 4,702,121 A | | 10/1987 | Hartmann |
| 4,705,284 A | * | 11/1987 | Stout .......................... 280/250.1 |
| 4,706,982 A | | 11/1987 | Hartmann |
| 4,715,246 A | | 12/1987 | Hartmann |
| 4,721,015 A | | 1/1988 | Hartmann |
| 4,735,430 A | | 4/1988 | Tomkinson |
| 4,903,857 A | * | 2/1990 | Klopfenstein ............... 280/267 |
| 4,936,597 A | | 6/1990 | Hartmann |
| 4,986,556 A | | 1/1991 | Hartmann |
| 5,224,724 A | | 7/1993 | Greenwood |
| 5,228,710 A | | 7/1993 | Lu |
| 5,242,343 A | | 9/1993 | Miller |
| 5,383,829 A | | 1/1995 | Miller |
| 5,527,246 A | | 6/1996 | Rodgers, Jr. |
| 5,591,107 A | | 1/1997 | Rodgers |
| 5,630,774 A | | 5/1997 | Geschwender |
| 5,775,708 A | | 7/1998 | Heath |
| 6,032,970 A | | 3/2000 | Porter |
| 6,045,487 A | | 4/2000 | Miller |
| 6,048,287 A | | 4/2000 | Rohloff |
| 6,171,217 B1 | | 1/2001 | Cutler |
| 6,386,566 B1 | | 5/2002 | Freeberg |
| 6,398,695 B2 | | 6/2002 | Miller |
| 6,402,174 B1 | * | 6/2002 | Maurer ......................... 280/267 |
| 6,419,252 B1 | | 7/2002 | Park |
| 6,468,178 B1 | | 10/2002 | Mohtasham |
| 6,485,041 B1 | | 11/2002 | Janssen |
| 6,572,128 B2 | | 6/2003 | Graf |
| 6,663,127 B2 | | 12/2003 | Miller |
| 6,708,997 B2 | | 3/2004 | Chait |
| 6,773,022 B2 | | 8/2004 | Janssen |
| 6,846,272 B2 | | 1/2005 | Rosenow |
| 6,852,060 B1 | | 2/2005 | Ash |
| 6,878,084 B2 | | 4/2005 | Hwang |
| 6,994,657 B1 | | 2/2006 | Eschenbach |
| 7,033,305 B1 | | 4/2006 | Stearns |
| 7,223,210 B2 | | 5/2007 | Krul |
| 7,270,625 B2 | | 9/2007 | Miller |
| 7,487,985 B1 | * | 2/2009 | Mighell ................. 280/124.103 |
| 7,976,046 B2 | * | 7/2011 | Rathsack ..................... 280/282 |
| 2003/0127822 A1 | | 7/2003 | Fleck |
| 2003/0193158 A1 | | 10/2003 | Hung |
| 2004/0005960 A1 | | 1/2004 | Chang |
| 2004/0209741 A1 | | 10/2004 | Kuo |
| 2006/0009331 A1 | | 1/2006 | Cheng |
| 2006/0049597 A1 | | 3/2006 | Chan |

FOREIGN PATENT DOCUMENTS

| | | | |
|---|---|---|---|
| DE | 10058466 | | 6/2002 |
| DE | 101-58-594 | | 6/2003 |
| DE | 203-19-128 | | 4/2004 |
| DE | 103-31-352 | | 2/2005 |
| JP | 2003-026068 A | | 1/2003 |
| JP | 26068 | * | 1/2003 |
| JP | 03131561 U9 | | 4/2007 |
| WO | 97/07860 | | 3/1997 |

OTHER PUBLICATIONS

Cussac, Yolaine "International Preliminary Report on Patentability"; The International Bureau of WIPO Jan. 1, 2012.

Won, Yoo Cheol "International Search Report" ISA/KR. Feb. 11, 2011.

* cited by examiner

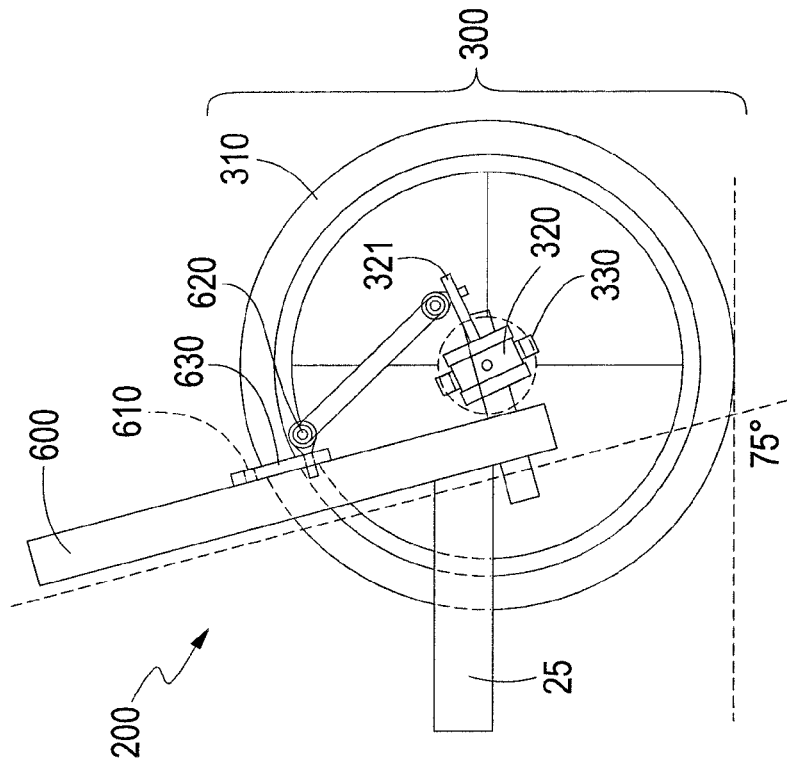
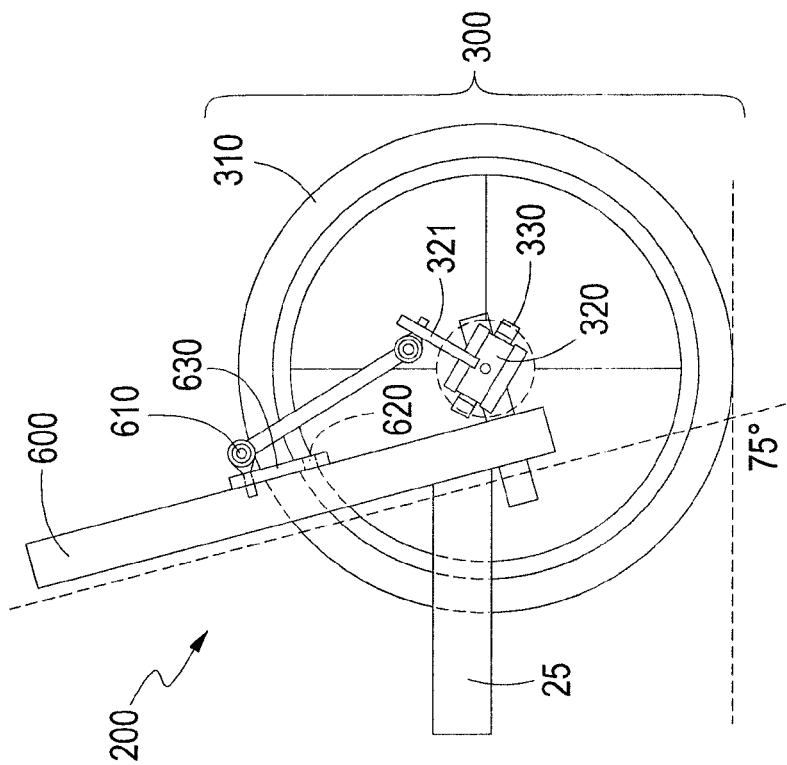
FIG. 6A
FIG. 6B

MOBILE ELLIPTICALLY DRIVEN DEVICE AND STEERING MECHANISM

CROSS-REFERENCE TO RELATED APPLICATIONS

This application cites for priority to U.S. Application No. 61/225,776, filed on Jul. 15, 2009, which is currently pending. This application is a continuation-in-part of U.S. application Ser. No. 11/173,213, filed on Jul. 1, 2005. This application incorporates by reference in their entireties U.S. Application No. 61/225,776 and U.S. application Ser. No. 11/173,213.

BACKGROUND

A. Field of the Disclosure

The field of the disclosure is steering mechanisms, vehicles comprising steering mechanisms, and methods of using both of the foregoing.

B. State of the Art

Wheeled vehicles are inherently unstable during turns. A moving vehicle entering a turn, as a consequence of its linear momentum, will be pushed toward the outside of the turn by what is often referred to as the centrifugal force, actually a fictitious force, which can result in overturning of the vehicle, skidding, and loss of control by the operator. The centrifugal force increases as the vehicle's speed increases and as the angle of the turn increases; consequently, so does the tendency to cause an adverse result.

A variety of mechanisms are used to counter centrifugal force during a turn. Some vehicles are capable of leaning into a turn, the most common examples being bicycles and motorcycles. Vehicles with three or more wheels cannot lean as easily, as lean can cause at least one of the wheels to lose contact with the ground's surface. Wheel camber, center-point steering, and Ackerman steering also improve tracking during a turn. Instability during turning is more severe in light vehicles, vehicles with high centers of balance, and vehicles with shorter wheel bases. Stability during turning has been a particularly intractable problem with human-powered vehicles having more than two wheels, particularly those in which the human operator must remain upright during operation. Consequently there is a long-felt but unmet need in the art for ways to increase the stability of wheeled vehicles during turns that does not require a vehicle to be designed to be larger or heavier than is practical for lightly powered vehicles (such as human-powered vehicles).

SUMMARY

A steering mechanism is provided that is capable of altering the toe angle of a wheel in conjunction with altering the camber angle of the wheel. Some embodiments of the steering mechanism can be controlled by leaning an upright member. The caster angle controls the proportion of toe angle to camber angle that occurs in response to leaning the upright member. In some embodiments of the steering mechanism the caster angle can be adjusted to provide a varying proportion of toe angle to camber angle in response to leaning the upright member. The adjustment may be performed by an operator, or it may be achieved automatically in response to sensor data. Vehicles comprising the steering mechanism are also provided, as are methods of turning a vehicle.

These capabilities and others are achieved by providing a steering mechanism comprising a wheel assembly and an upright member configured to lean relative to the wheel assembly, the wheel assembly comprising: a wheel having an axis of rotation, a toe angle, and a camber angle; a steering knuckle fastened to the wheel comprising a steering arm; a kingpin having a swivel axis, a caster angle, and a kingpin inclination ("KPI"), the kingpin positioned within the steering knuckle such that the steering knuckle is free to swivel about the swivel axis; a kingpin bracket bracketing the kingpin; a steering linkage having an inboard end and an outboard end, the outboard end fastened to the steering arm in a configuration to control the degree of swivel of the steering knuckle about the swivel axis, the inboard end fastened to the upright member at a first attachment point; a support member supportingly fastened to the kingpin bracket; and a caster point that is the intersection of the axis of rotation of the wheel and the swivel axis of the kingpin.

Also provided is a mobile device comprising a frame including a longitudinal frame member oriented substantially horizontally, a transverse frame member oriented substantially horizontally, joined in a substantially normal orientation to the longitudinal member, and an upright frame member joined to the longitudinal member at a position rearward of said transverse member. On either end of the transverse frame member is a front wheel, and a rear wheel driven by a drive assembly is rotationally coupled to the rear end of said longitudinal frame member.

The mobile device may comprise a pair of elongate striding members positioned substantially horizontally along either side of the longitudinal frame member, with the rearward end of each striding member rotationally coupled to the outer end of each of a pair of opposing cranks. The inner end of each of the pair of opposing cranks, oriented 180° apart, is configured to impart rotational motion to the rear wheel along the rear wheel's axis of rotation when the cranks are rotated. In one embodiment of the mobile device, the outer end of said cranks, when rotated, defines a path concentric with the axis of rotation of the rear wheel. In some embodiments, a pair of upright arm levers, each with an upper grip end and a lower pivot end, is pivotally coupled to the upright frame member so that the upper and lower ends of the arm levers may reciprocate back and forth about the pivot point. The lower pivot end of each arm lever is pivotally coupled to the front end of one of the striding members. Some embodiments of the drive assembly comprise a chain ring rotationally coupled to the inner end of at least one of the cranks, a drive chain engaged to the chain ring, and a sprocket engaged to the drive chain and configured to impart rotational motion to the rear wheel along the rear wheel's axis of rotation. Some embodiments of the drive assembly include a hub body, a rotating axle (to which the inner ends of the crank arms are affixed), and an internal gear system translating the rotation of said axle to the hub body. The device also may include any mechanism for steering disclosed herein, as well as brakes and multiple gearing.

BRIEF DESCRIPTION OF THE DRAWINGS

FIG. 6. A side view of an embodiment of the steering mechanism comprising an adjustable caster angle in two alternative positions (6A and 6B).

DETAILED DESCRIPTION

A. Definitions

The term "including" as used herein is intended to be non-limiting, and can be read to mean "including but not limited to."

The term "camber" as used herein refers to the vertical inclination of the wheels of a vehicle relative to the rest of the vehicle, wherein the wheels are generally parallel to one another. In this context, "camber" does not refer to a configuration of the wheels in which the top or bottom edge of both wheels is either closer to the center line or farther from the center line than the opposite edge.

Figure 11:
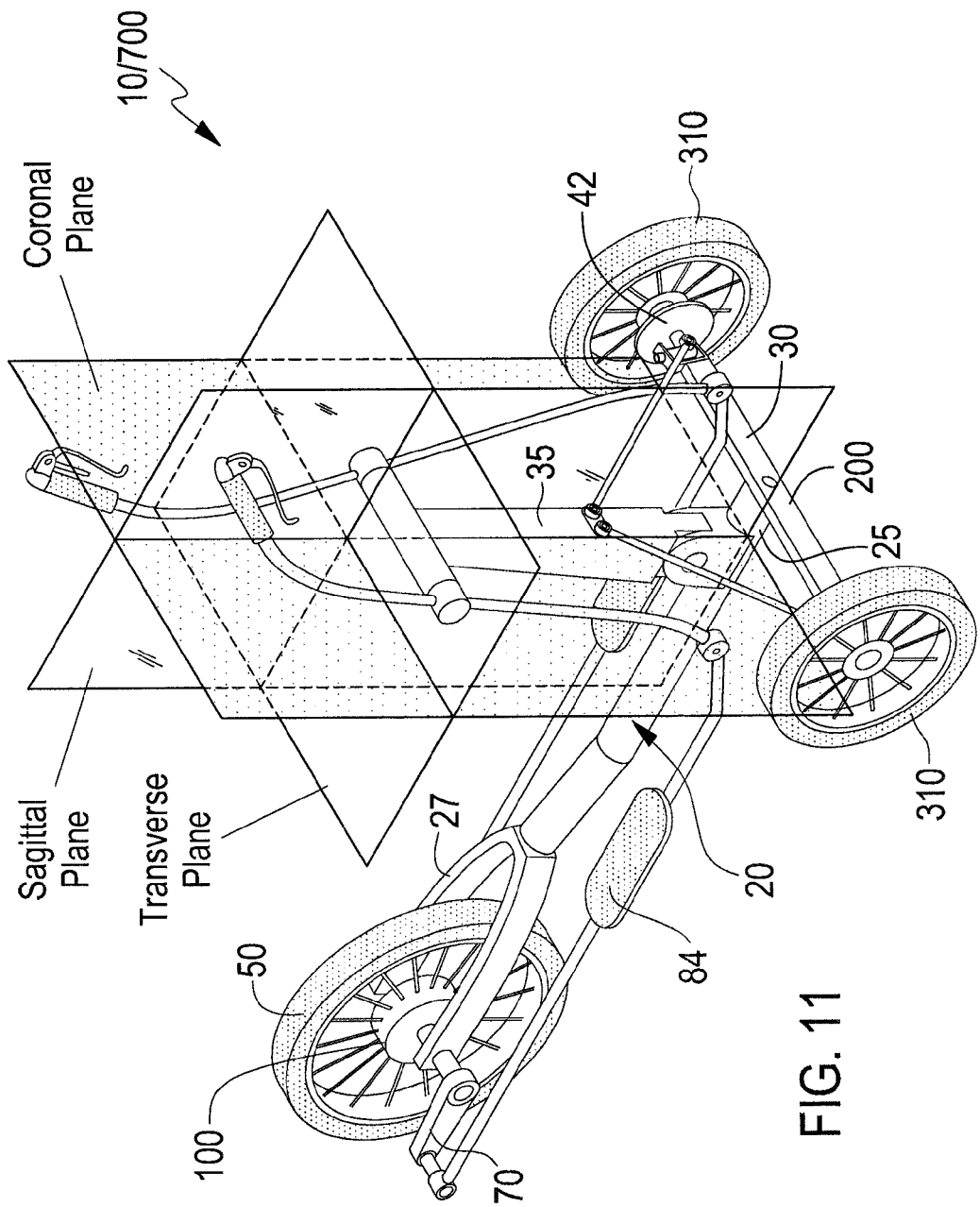
FIG. 11. An illustration of the sagittal, coronal, and transverse planes.

The term "sagittal plane" as used herein refers to the plane that is vertical, comprises the front-rear axis of a vehicle (or is parallel to it), and divides a right (dextral) side of the vehicle from a left (sinistral) side of the vehicle, as illustrated in FIG. 11.

The term "coronal plane" refers to a vertical plane that is perpendicular to the sagittal plane, separating a front portion of a vehicle from a rear portion, as illustrated in FIG. 11.

The term "transverse plane" refers to a horizontal plane that is perpendicular to the sagittal and coronal planes, separating an upper portion of a vehicle from a lower portion of a vehicle, as illustrated in FIG. 11.

The term "caster angle" as used herein refers to the difference in angle between: a first plane that comprises the line that is the axis of pivot of a kingpin or a steering knuckle and that is perpendicular to the sagittal plane; and a coronal plane.

The term "kingpin inclination" ("KPI") or "kingpin angle" as used herein refers to the difference in angle between: a first plane that comprises the line that is the axis of pivot of a kingpin or a steering knuckle and that is perpendicular to the coronal plane; and the sagittal plane.

The term "toe angle" as used herein refers to the difference in angle between: the line that is the intersection of a plane that comprises the circumference of a wheel and the transverse plane; and the line that is the intersection of the sagittal plane and the transverse plane.

The term "Ackerman angle" as used herein refers to the difference in angle between the toe angle of an inner wheel of a turn and the toe angle of an outer wheel of a turn.

The term "camber angle" as used herein refers to the difference in angle between: the line that is the intersection of a plane comprising the circumference of a wheel and the coronal plane; and the line that is the intersection of the sagittal plane and the coronal plane.

B. Steering Mechanisms

Figure 1:
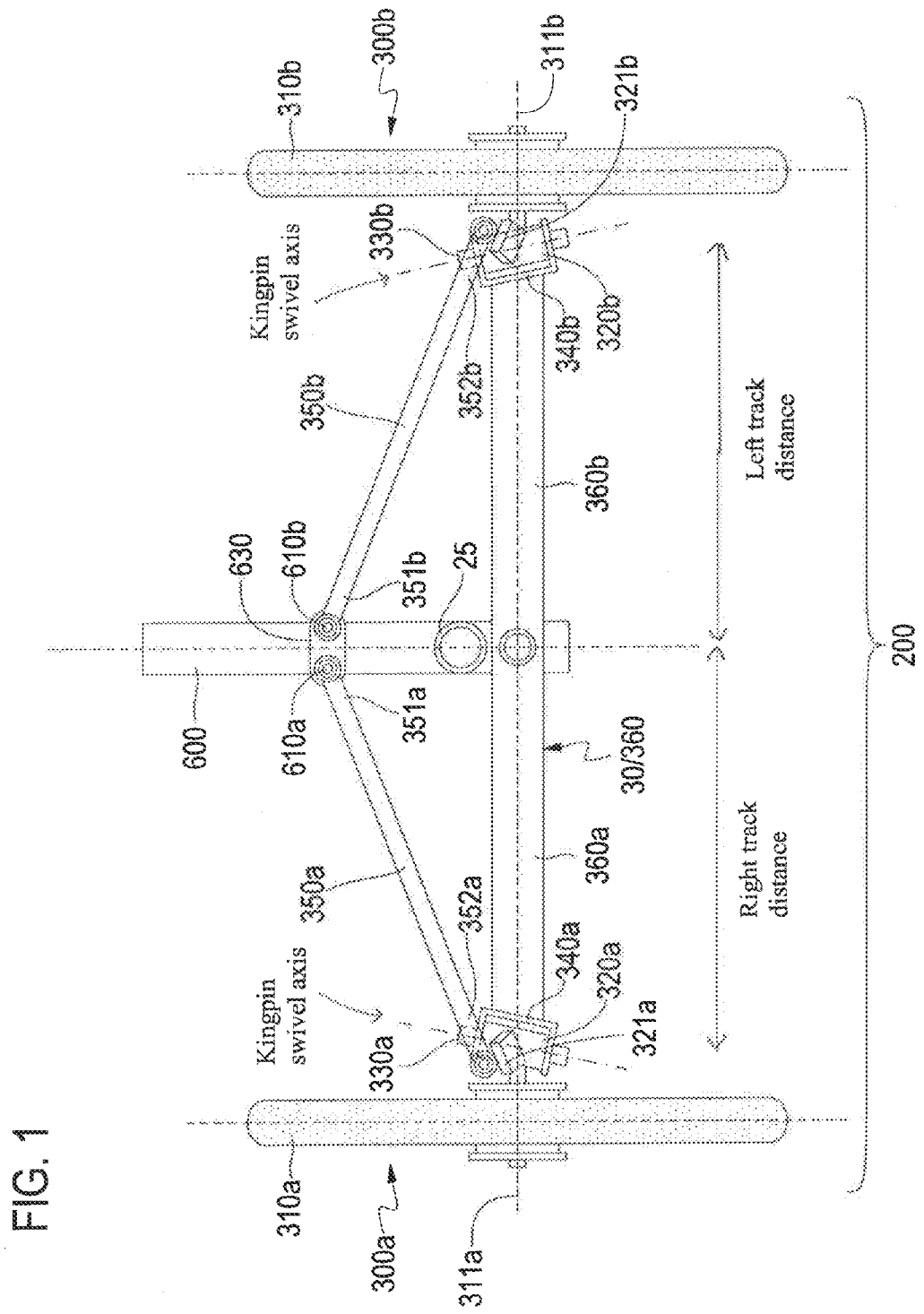
FIG. 1. A front view of an embodiment of the steering mechanism.

A steering mechanism 300 is provided, an embodiment of which is shown in FIG. 1, capable of altering the toe angle in conjunction with camber angle of a wheel 310. FIG. 1 illustrates a steering mechanism 300 with two wheels, a right wheel 310a and a left wheel 310b. The suffixes "a" and "b" are used to distinguish the right and left assemblies, respectively. Where the description herein is generally applicable to either wheel assembly, or to a single wheel assembly, the reference numerals are provided without an "a" or "b" suffix.

The mechanism comprising a wheel assembly 300 and an upright member 600 configured to lean relative to the wheel assembly 300, the wheel assembly 300 comprising: a wheel 310 having an axis of rotation, a toe angle and a camber angle; a steering knuckle 320 fastened to the wheel 310 comprising a steering arm 321; a kingpin 330 having a swivel axis, a caster angle, and a KPI, the kingpin 330 positioned within the steering knuckle 320 such that the steering knuckle 320 is free to swivel about the swivel axis; a kingpin bracket 340 bracketing the kingpin 330; a steering linkage 350 having an inboard end 351 and an outboard end 352, the outboard end 352 fastened to the steering arm 321 in a configuration to control the degree of swivel of the steering knuckle 320 about the swivel axis, the inboard end 351 fastened to the upright member 600 or a swivel joint on the upright member; a support member 360 supportingly fastened to the kingpin bracket 340; and a caster point that is the intersection of the axis of rotation of the wheel 310 and the swivel axis of the kingpin 330.

The wheel 310 can be any wheel known in the art, including a wheel of a vehicle 700. The wheel may comprise a hub, or it may be a "hubless" wheel. Those skilled in the art understand that a hubless wheel comprises a hub, although the diameter of the hub is a large fraction of the diameter of the wheel. Conventional hubbed wheels comprise a hub and an attachment between the hub and the rim of the wheel. The attachment is typically in the form of one or more spokes on lightweight vehicles 700. The attachment may be achieved by the use of a solid wheel, such as a plain disc wheel. These various forms of wheel have varying degrees of strength generally inversely related to weight, so the form of wheel will depend on the application. The wheel's 310 axis of rotation will pass through any hub that may be present and through any axle that may be present. The axle may be a rotating axle or a fixed axle.

The toe angle of the wheel 310 is the inclination of the wheel 310 relative to the normal direction of motion of the vehicle 700 when viewed from above. The toe angle of the wheel 310 is at least slightly variable to allow steering to occur. The range of possible toe angle will encompass 0°, at least insofar as it is desirable for the vehicle 700 to proceed in a forward direction without turning. The maximum toe angle to the left and to the right will vary depending on the application. The toe angle will not normally exceed 90°. Generally the maximum left toe angle will be about the same as the maximum right toe angle.

The wheel's 310 camber angle is the inclination of the wheel 310 relative to a vertical plane parallel to the toe angle of the same wheel 700. The camber of the wheel 310 is variable in some embodiments of the mechanism 200. If more than one wheel 310 is present, the camber angles of two or more wheels 310 may be substantially (or completely) parallel.

The steering knuckle 320 serves to support the wheel 310 such that the wheel 310 is free to rotate and is capable of pivoting in relation to the rest of the vehicle 700 to effect changes in the toe angle or the camber angle. The steering knuckle 320 provides pivot in conjunction with a kingpin 330 and a kingpin bracket 340. In some embodiments of the mechanism the steering knuckle 320 and the kingpin bracket 340 form a hinge, in which the kingpin 330 serves as a hinge pin. The steering knuckle 320 shares a pivot axis with the kingpin 330. The steering knuckle 320 comprises a steering arm 321. The steering arm 321 is coupled to a steering control mechanism 600 and serves to translate the motion of the steering control mechanism to pivot, which results in a change in toe or camber angle.

In some embodiments of the mechanism comprising a hub and an axle, the steering knuckle 320 is connected to the wheel 310 via the axle which in turn is connected to the hub.

The kingpin 330 has a swivel axis, a caster angle, and a kingpin angle (KPI). The kingpin 330 shares the swivel axis with the steering knuckle 320. The kingpin 330 is positioned to allow the steering knuckle 320 to swivel. Such positioning is understood by those skilled in the art, and generally includes fitting the kingpin 330 on the interior of a hollow steering knuckle 320. If the caster angle is significantly above zero, then the kingpin 330 must be able to bear some of the load or the entire load borne by the wheel 310.

The KPI can be set to provide center point steering. Center point steering in this context refers to a configuration wherein the king pin axis of rotation intersects with the tire contact patch on the ground, a configuration that minimizes the force required to toe steer. Typically, the caster angle of the king pin is >0° such that the king pin axis of rotation intersects with the tire track line on the ground in front of the tire contact patch, a configuration that increases tracking stability. Some embodiments of the mechanism may comprise a KPI of about zero, thus providing no center point steering; other embodiments will have a KPI to provide or approximate center point steering.

The kingpin bracket 340 functions to hold the kingpin 330 in place, bracketing it. One embodiment of the kingpin bracket 340 is a wishbone-shaped bracket, in which the kingpin 330 penetrates each arm of the wishbone. The wishbone may be curved or angular; in one exemplary embodiment the wishbone is formed by three sides of a rectangle. In other embodiments the wishbone may be formed by a crescent, U-shape, two sides of a triangle, or any other shape that will allow the kingpin 330 to be adequately bracketed.

The upright member 600 is configured to lean at least partially in the coronal plane about an axis of lean. The axis of lean is generally oriented along the forward-backward axis. The upright member 600 is connected to the steering linkage 350 such that leaning in the coronal plane causes the steering linkage 350 to push or pull the steering arm 321 causing the steering knuckle 320 to pivot. The upright member 600 is connected to the steering linkage 350 at a steering linkage connection point 610. The steering linkage connection point 610 may be above the axis of lean. This has the advantage in some embodiments of causing the wheel 310 to toe and/or camber in the direction of lean, compensating for the centrifugal force produced by a turn. In some embodiments of the mechanism, the steering linkage connection point 610 may be below the axis of lean. This has the advantage in some embodiments of causing the wheel 310 to toe and/or camber in the direction of lean of the upright member 600, compensating for the centrifugal force produced by a turn.

The support member 360 is connected to the kingpin bracket 340 and bears the load of the wheel assembly 300.

An imaginary "caster point" exists at the intersection of the wheel's 310 axis of rotation and the swivel axis of the kingpin 330 and steering knuckle 320. In some embodiments of the mechanism the caster point is immobile or generally immobile relative to at least one of the kingpin bracket 340, the support member 360, and the frame of a vehicle 700.

In some embodiments of the mechanism (such as that illustrated in FIG. 1) the wheel assembly 300 is a dextral wheel assembly 300a, the wheel 310 is a dextral wheel 310a, the steering knuckle 320 is a dextral steering knuckle 320a, the steering arm 321 is track line intersects the dextral caster point and the sinistral caster point. The track line comprises a track center point equidistant from the dextral caster point and the sinistral caster point, a track distance from the dextral caster point to the sinistral caster point, a right track distance a from the dextral caster point to the track center point, and a left track distance b from the sinistral caster point to the track center point.

Figure 3:
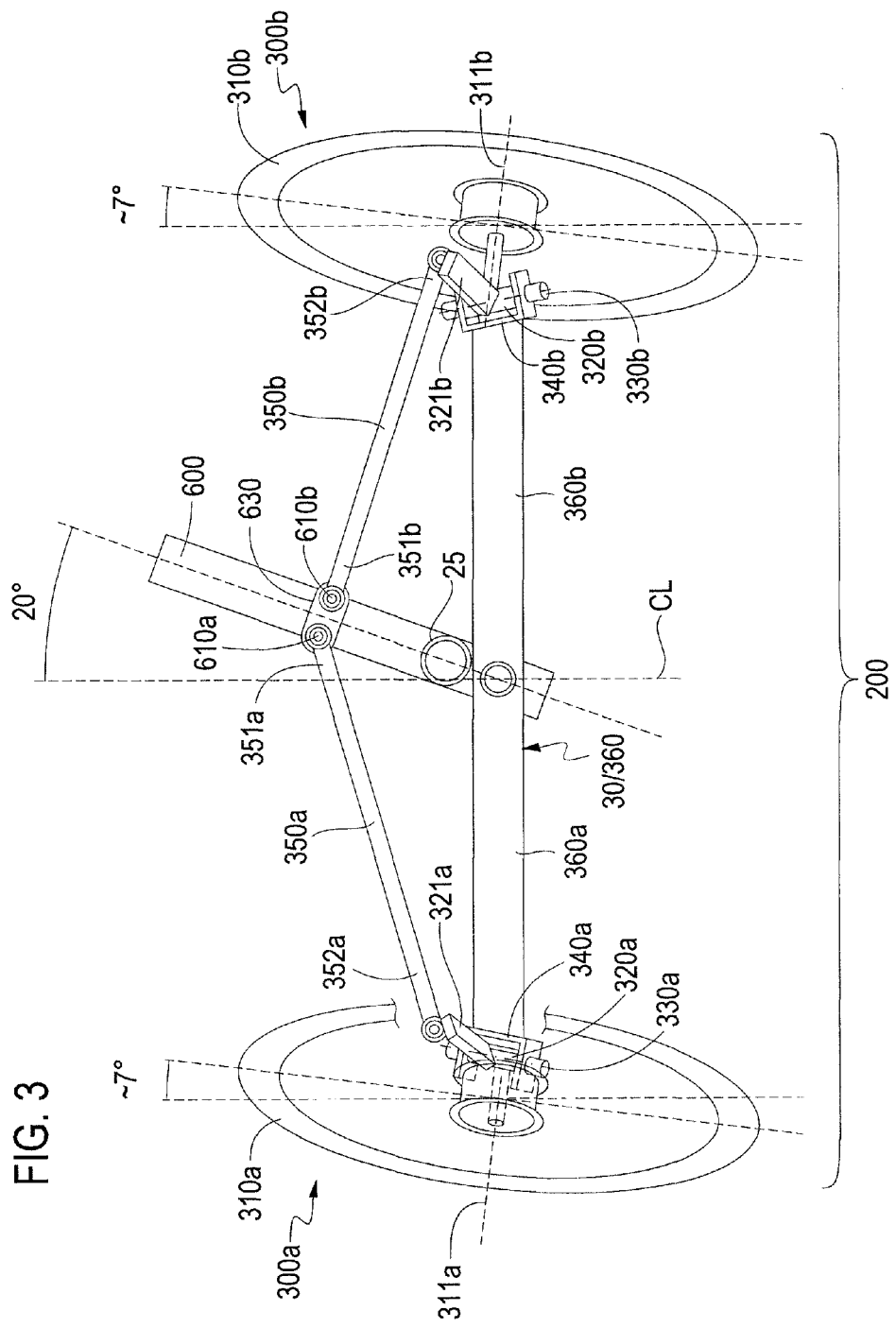
FIG. 3. A front view of an embodiment of the steering mechanism with a 30° caster angle.
Figure 4:
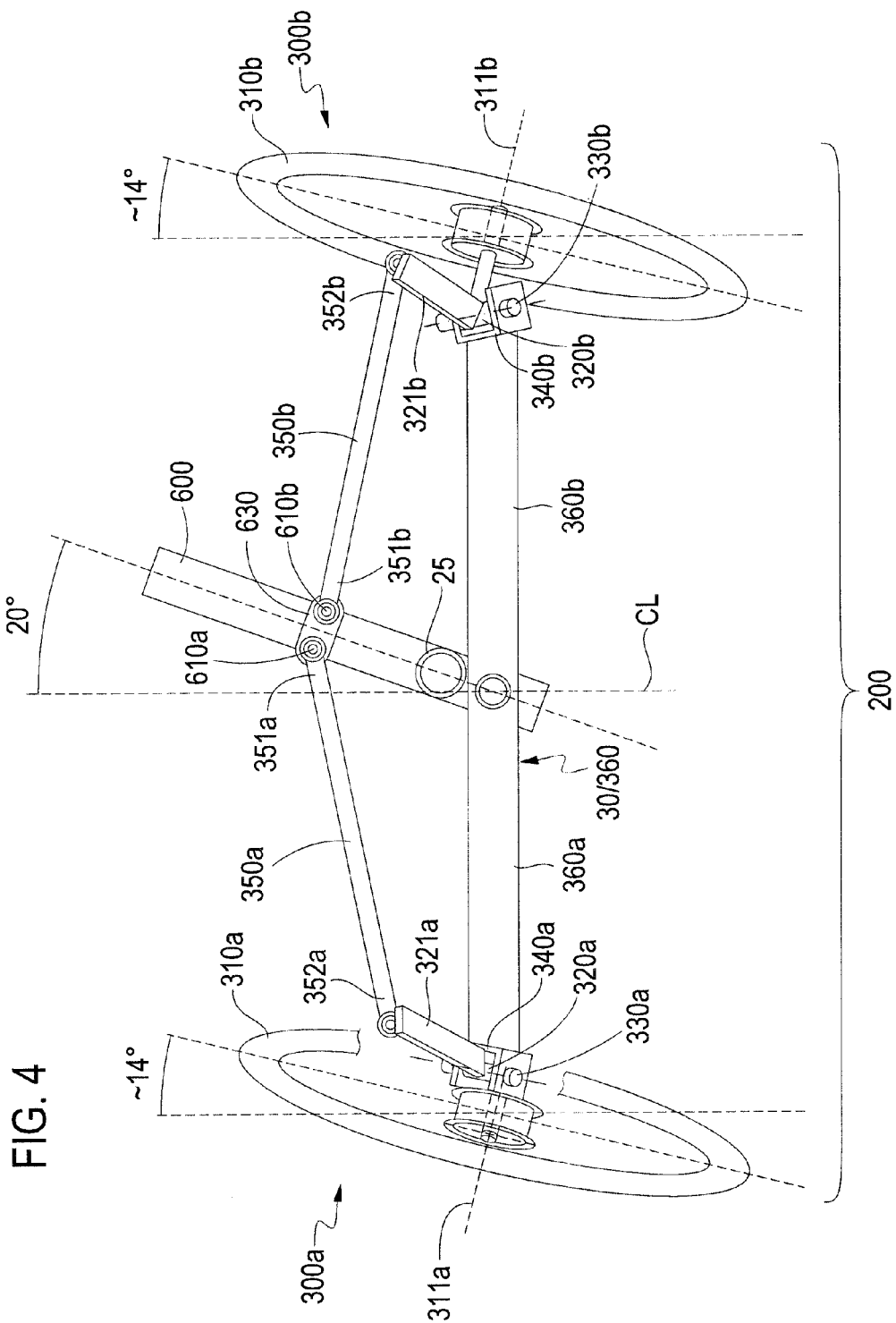
FIG. 4. A front view of an embodiment of the steering mechanism with a 60° caster angle.

In embodiments comprising two wheel assemblies 300, Ackerman steering may be provided by positioning the steering linkage attachment points 610 such that each is slightly offset from the sagittal plane comprising the track center point. That is to say that the dextral steering linkage attachment point 610a is to the right of the sagittal plane comprising the track center point and the sinistral steering linkage attachment point 610b is to the left of the sagittal plane comprising the track center point. The result is that, when the wheels 310 are toe-steered to the right, the toe angle of the dextral wheel 310 is sharper than is the toe angle of the sinistral wheel 310. When the wheels 310 are toe-steered to the left, the toe angle of the sinistral wheel 310 is sharper than is the toe angle of the dextral wheel 310. This mechanism is illustrated in FIGS. 2-4.

Figure 2:
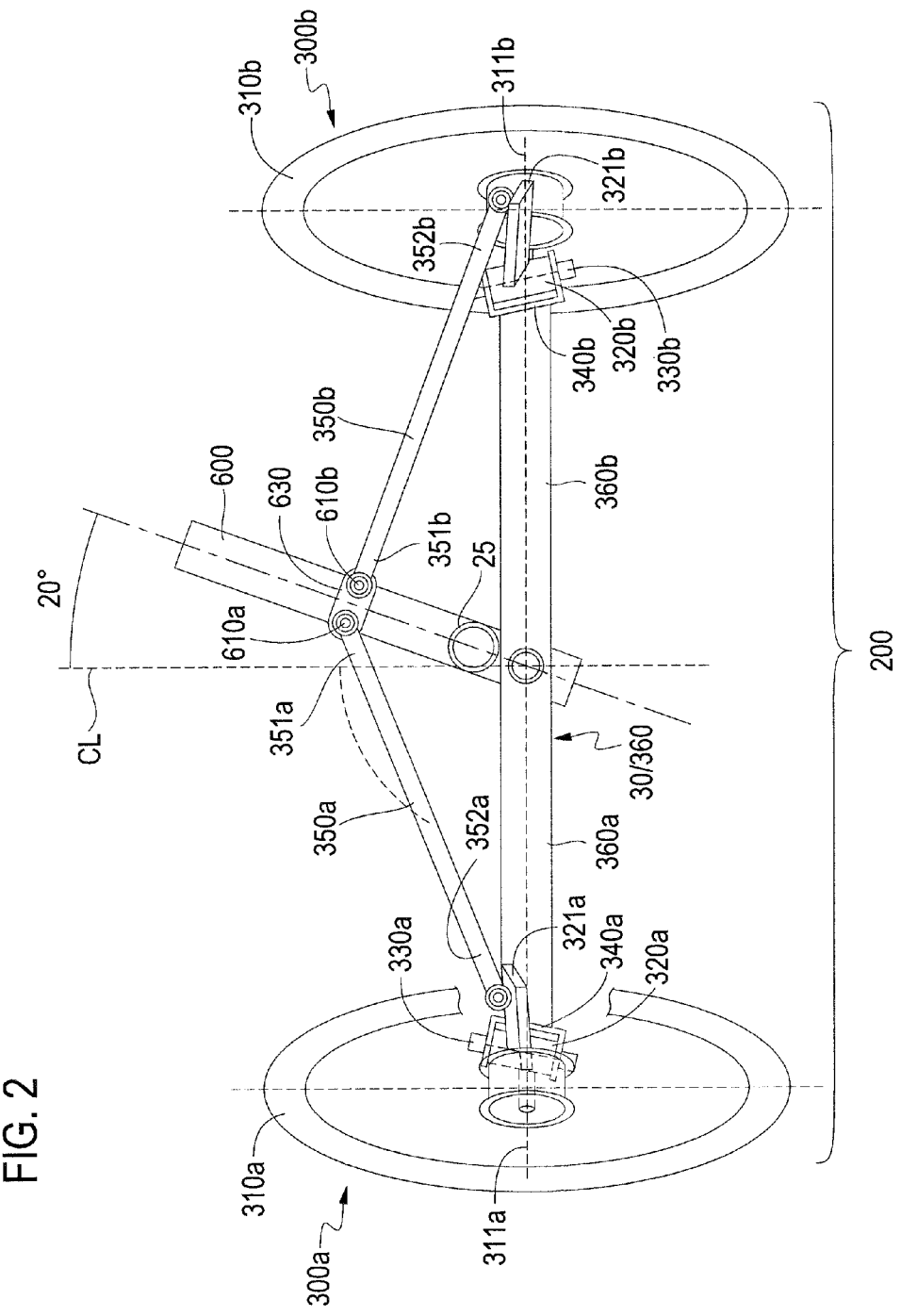
FIG. 2. A front view of an embodiment of the steering mechanism with 0° caster angle.

FIG. 2 further illustrates a means of achieving Ackerman steering in an embodiment of the steering mechanism as seen from the front of the mechanism. Ackermann offset of the inboard steering linkage attachment 610 to the head tube bracket 630, from the center line provides correction so that during a turn the inner wheel turns slightly farther than does the outer wheel. During a sinistral lean there is a larger average sinistral vector of the arc of the sinistral attachment point 610b than the average dextral vector of the dextral attachment point 610a directed away from the dextral steering arm 321a. This causes the sinistral steering arm 321b to move farther away from the center a dextral steering arm 321a, the kingpin 330 is a dextral kingpin 330a, the kingpin bracket 340 is a dextral kingpin bracket 340a, the steering linkage 350 is a dextral steering linkage 350a, the first attachment point 610 is a first dextral attachment point 610a, the support member 360 is a dextral support member 360a, and the caster point is a dextral caster point. Such embodiments of the mechanism further comprise a sinistral wheel assembly 300b. The sinistral wheel assembly 300b comprises: a sinistral wheel 310b having an axis of rotation, a toe angle, and a camber angle; a sinistral steering knuckle 320b fastened to the sinistral wheel 310b comprising a sinistral steering arm 321b; a sinistral kingpin 330b having a swivel axis, a caster angle, and a KPI, the sinistral kingpin 330b positioned within the sinistral steering knuckle 320b such that the sinistral steering knuckle 320b is free to swivel about the swivel axis; a sinistral kingpin bracket 340b bracketing the sinistral kingpin 330b; a sinistral steering linkage 350b having an inboard end 351b and an outboard end 352b, the outboard end 352b fastened to the sinistral steering arm 321b in a configuration to control the degree of swivel of the sinistral steering knuckle 320b about the swivel axis, the inboard end 351b fastened to the upright member 600 at a first sinistral attachment point 610b; a sinistral support member 360b supportingly fastened to the sinistral kingpin bracket 340b; and a sinistral caster point that is the intersection of the axis of rotation of the sinistral wheel 310b and the swivel axis of the sinistral kingpin 330b. The components of the sinistral wheel assembly 300b may share any of the properties and configurations of their dextral counterparts, although in some cases these will be in mirror image.

In embodiments of the mechanism comprising a dextral wheel assembly 300a and a sinistral wheel assembly 300b it is useful to imagine a "track line". The imaginary line than the dextral steering arm 321a moves toward the center line so that during sinistral lean the sinistral wheel swivels farther into the turn than the dextral wheel.

As illustrated in FIGS. 6-10, some embodiments of the steering mechanism are configured such that the caster angle of the dextral kingpin 330a may be adjusted by rotating the dextral kingpin bracket 340a about the track line, and the caster angle of the sinistral kingpin 330b may be adjusted by rotating the sinistral kingpin 330b about the track line. The amount of toe and camber imparted by leaning the upright member 600 will be determined by the amount of lean, the caster angle and the geometry of the steering linkages, including the length of the steering knuckle steering arm 321 from the outboard linkage attachment 352 to the caster point of the kingpin 330, and the distance from the inboard steering linkage attachment point 610 to the upright frame member's axis of rotation. Once the geometry of the linkage attachment points is set then varying the caster angle allows the operator to adjust the toe and camber angles during the lean.

For clarity several of these variables are now defined. The upright frame member lean angle is $A_L$, is dictated how far the rider leans the vehicle. The caster angle, $A_C$, can be adjusted from 0° to 90° to adjust the toe angle $A_T$ and camber angle $A_M$. The toe and camber angles are governed by the linkage geometry and the lean angle, $A_L$. For a given geometry and an $A_L$, the maximum toe angle, $A_{Tmax}$, occurs at a caster angle, $A_C$, of 0° and the maximum camber angle, $A_{Mmax}$, occurs at a caster angle, $A_C$, of 90°. Although $A_T$ and $A_M$ are geometry independent and do not have to be equivalent, within a specific geometry, the ratio of toe to camber is strictly controlled by $A_C$.

In some exemplary embodiments, the linkage geometry can be set so that at an $A_L$ of 20°, the $A_{Tmax}$ is 20° and the $A_{Mmax}$ is 20°. However, the linkage geometry can also be set so that at an $A_L$ of 20° can result in an $A_{Tmax}$ ranging from <20° to >20°, and $A_{Mmax}$ ranging from <20° to >20°. For a given linkage geometry and $A_L$, both $A_T$ and $A_M$ are defined and the ratio of toe to camber can be calculated at any $A_C$. For example, using the above geometry where an $A_L$ of 20° sets the $A_{Tmax}$ to 20° and the $A_{Mmax}$ to 20°, the ratio of toe to camber can be determined at any $A_C$ as a function of $A_T$ and $A_M$ at any $A_C$ using the following equations, respectively:

$$A_T = (1-(A_C/90))*A_{Tmax} \quad (1)$$

$$A_M = (A_C/90)*A_{Mmax} \quad (2)$$

For the above geometry, an $A_C$ of 45° will result in an $A_T$ of 10° and an $A_M$ of 10°, giving a toe to camber ratio of 1:1. Leaning the frame will cause the front wheels to toe and camber in an equal ratio. An $A_C$ of 30° will result in an $A_T$ of about 14° and an $A_M$ of about 7°, giving a toe to camber ratio of 2:1. An $A_C$ of 60° will result in an $A_T$ of about 7° and an $A_M$ of about 14°, giving a toe to camber ratio of 1:2.

In general with any frame geometry, leaning the frame will cause the front wheels to mostly toe steer at low caster angles and mostly camber at high caster angles. The shift from lower to higher caster angles would be advantageous as speed increases to counter the greater centrifugal forces of the turn that require more camber leaning and less toe steering. If provided with an adjustable caster angle, the operator can tune the steering systems according to the operator's skill and the operating conditions.

FIG. 2 illustrates an embodiment of the steering mechanism 200 in which the caster angle is 0°. Note that offset of the steering linkage attachment point 610 to the upright number 600 from the center line, CL, provides Ackermann correction so that during a turn the inner wheel rotates slightly farther than the outer wheel. Note also that kingpin 330 is angled in the vertical plane parallel to the front beam to provide center point steering. As illustrated, with 0° caster angle, a 20° lean of the upright member 600 will provide only toe steering at an amount governed by the angle of the steering linkage 350 and length of steering knuckle 320, say 30° for the depicted configuration. Due to the Ackerman steering, the wheel on the inside of the turn will have a toe angle of slightly greater than 30° C., whereas the wheel on the outside of the turn will have a toe angle of slightly less than 30°.

FIG. 3 illustrates the embodiment of the steering mechanism shown in FIG. 2, except in which the caster angle is 30°. Note that with a 30° caster angle and the same 20° lean as illustrated in FIG. 2, the toe angle decreases to about ⅔ of the previous example of 30° toe, or now 20° (again subject to the effects of Ackerman steering), while the camber angle increases to ⅓ of the head tube angle, or about 7°.

FIG. 4 illustrates the embodiment of the steering mechanism shown in FIGS. 2 and 3, except in which the caster angle is 60°. Note that with a 60° caster angle and the same 20° lean, the toe angle decreases to about ⅓ of the previous example of 30° toe, or now 10°, while the camber angle increases to ⅔ of the head tube angle, or about 14°.

Figure 5:
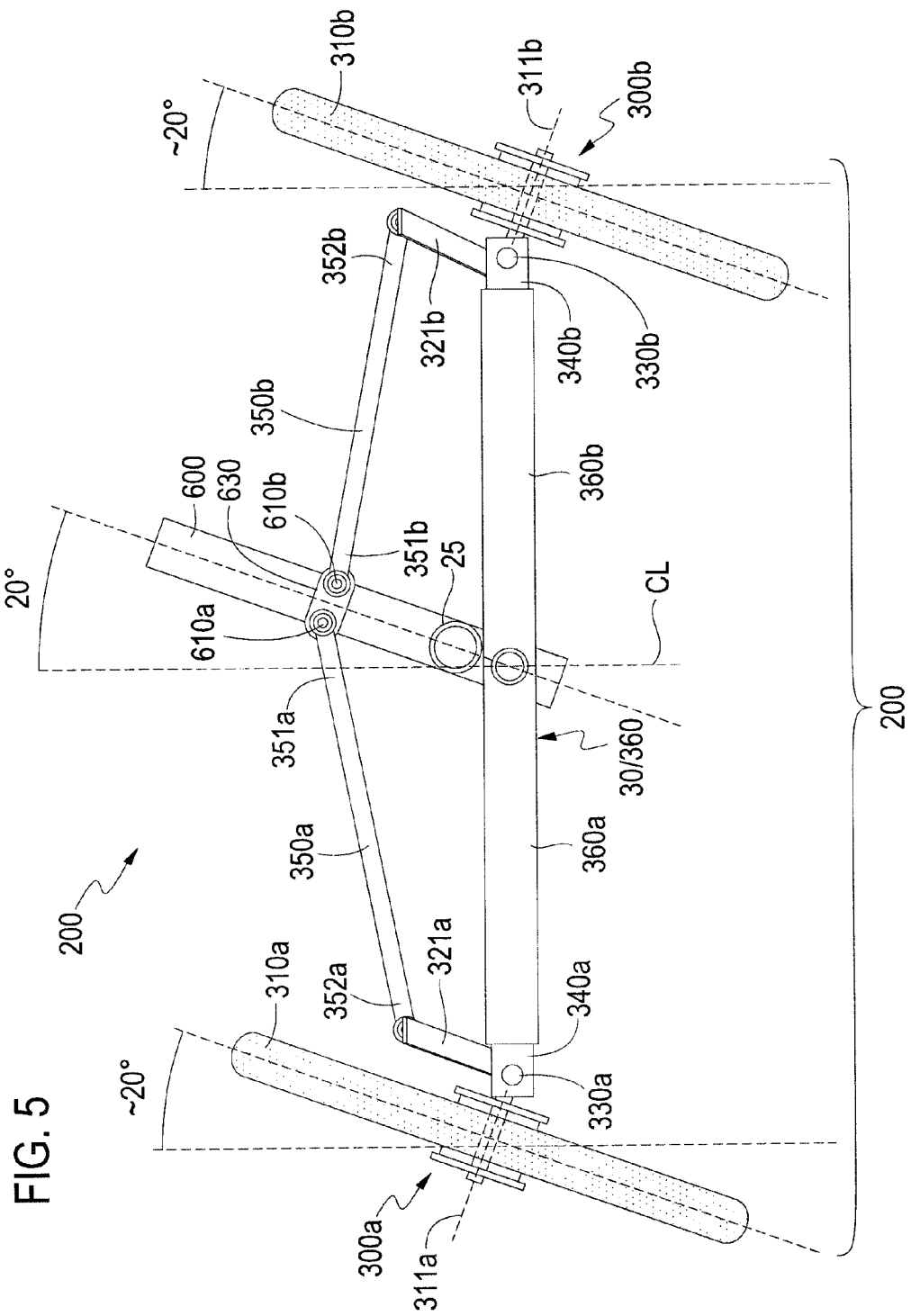
FIG. 5. A front view of an embodiment of the steering mechanism with a 90° caster angle.
Figure 7:
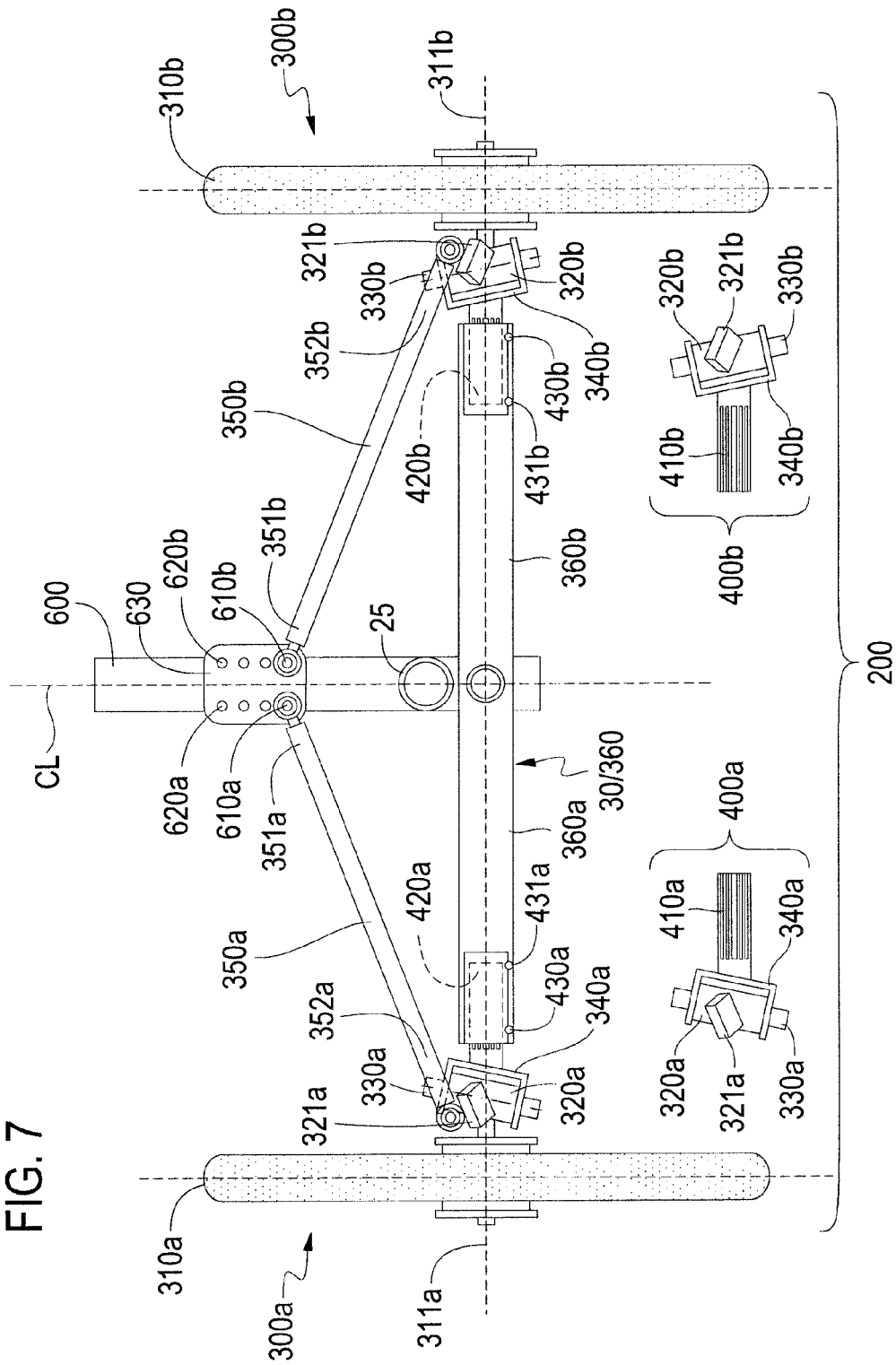
FIG. 7. A front view of an embodiment of the steering mechanism comprising a caster angle that is adjustable by the operator.

FIG. 5 illustrates the embodiment of the steering mechanism shown in FIGS. 2-4, except in which the caster angle is 90°. Note that with a 90° caster angle and the same 20° lean, the toe angle decreases to 0° toe while the camber angle increases to 3/3 of the head tube angle, or to 20°. Note also that in the presence of camber without toe there will be no turning.

A high ratio of camber to toe is desirable under certain circumstances (for example, if the operator needs to make a high-speed turn). In some circumstances, more toe is needed and less camber is needed (such as during low-speed fine maneuvering). Although camber in the absence of toe will generally not turn the vehicle 700 (so long as the camber angle of each wheel is parallel to the camber angle of the opposite wheel), it can be desirable to correct for conditions that cause turn-independent lean of the operator (for example, a slanted road surface or a high crosswind). Toe in the absence of camber is useful for low-speed fine maneuvers, but may not be sufficiently stable for high-speed turns.

In some configurations, a change in caster angle requires that the track distance be changed as well. This can be accomplished by a number of mechanisms, some embodiments of which are illustrated in FIGS. 7-10. The increase in track distance as caster angle increases has the advantage of providing greater stability. Caster angle can be varied while maintaining the parallel orientation of the wheels by varying the position of the steering linkage attachment 610 on the steering linkage bracket 630. In such embodiments the dextral kingpin bracket 340a is movably supported by the dextral supporting member 360a such that the right track distance a may be adjusted and wherein the sinistral kingpin bracket 340b is movably supported by the sinistral supporting member 360b such that the left track distance b may be adjusted. Some such embodiments further comprise a dextral bracket mount 400a fastened to the dextral kingpin bracket 340a and movably supported by the dextral supporting member 360a; a dextral bracket mount lock 430a positioned to allow the dextral bracket mount 400a to be reversibly locked into place relative to the dextral supporting member 360a; a sinistral bracket mount 400b fastened to the sinistral kingpin bracket 340b and movably supported by the sinistral supporting member 360b; and a sinistral bracket mount lock 430b positioned to allow the sinistral bracket mount 400b to be reversibly locked into place relative to the sinistral supporting member 360b.

In some embodiments the length of the steering linkage 350 is adjustable. One such embodiment is illustrated in FIG. 6. In some embodiments, adjustment of the caster angle will require that the steering linkage 350 be shortened or, if kept constant length, will have to be raised to a new position on the upright member 600. Therefore the steering linkage bracket 630 may have multiple steering linkage attachment points 610 (thus comprising an additional steering linkage attachment point 620), as shown.

In some embodiments of the mechanism the bracket mounts 400 provide structures that may be moved in and out along an axis parallel to the track line to adjust the track distance. This may require the operator to stop the vehicle 700, detach the inboard end 351 of the steering linkage 350 from the steering linkage attachment point 610, slide the bracket mount 400 in an outboard or inboard direction, and reattach the inboard end 351 of the steering linkage 350 to another steering linkage attachment point 620. In one such embodiment illustrated in FIG. 7, the dextral bracket mount 400a comprises a splined rod 410a positioned within a dextral splined shaft 420a, the dextral supporting member comprises the dextral splined shaft 420a, the dextral bracket mount lock 430a comprises a clamping screw 431a, the sinistral bracket mount 400b comprises a splined rod 410b positioned within a sinistral splined shaft 420b, the sinistral supporting member 360b comprises the sinistral splined shaft 420b, and the sinistral bracket mount lock 430b comprises a clamping screw 431b. The splined rod-and-shaft configuration prevents the bracket mount 400 from rotating when locked in place, and the clamping screws 431 prevent the bracket mount 400 from sliding in the inboard or outboard direction. In the illustrated embodiment the operator selects caster angle by sliding out a splined bracket mount 400 and reinserting it back into the transverse member 360 then raising inboard steering linkage end 351 to new position. The kingpin bracket 340 is connected to a bracket mount 400 comprising the splined rod 410 configured to fit into the splined shaft 420 within the transverse member 360.

In some embodiments of the mechanism 200 the caster angle can be changed without changing the position of the steering linkage attachment point 610. In one such embodiment illustrated in FIG. 8, the mechanism 200 further comprises: a dextral bracket mount 400a fastened to the dextral kingpin bracket 340a, the dextral bracket mount 400a comprising a circular housing 440a and a dextral index pin 450a; a dextral guide sheath 460a comprising a guide slot 461a defining the movement of the dextral index pin 450a such that caster angle increases as the right track distance increases; a sinistral bracket mount 400b fastened to the sinistral kingpin bracket 340b, the sinistral bracket mount 400b comprising a circular housing 440b and a sinistral index pin 450b; a sinistral guide sheath 460b comprising a guide slot 461b defining the movement of the sinistral index pin 450b such that as caster angle increases as the left track distance increases; and a drive shaft 500 fastened to at least one of the dextral bracket mount 400a to provide rotation to the dextral bracket mount 400a about the track line, and the sinistral bracket mount 400b to provide rotation to the sinistral bracket mount 400b about the track line.

In such embodiments rotation of the drive shaft 500 rotates the bracket mount 400. The shape of the guide slot 461 determines the path of the index pin 450, which in turn determines whether the bracket mount 400 slides in an inboard or outboard direction in response to clockwise or counterclockwise rotation. The guide slot 461 may be configured to provide an increase in track distance that is linear with respect to the change in caster angle, or the relationship between caster angle and track distance may be another suitable function.

Figure 8:
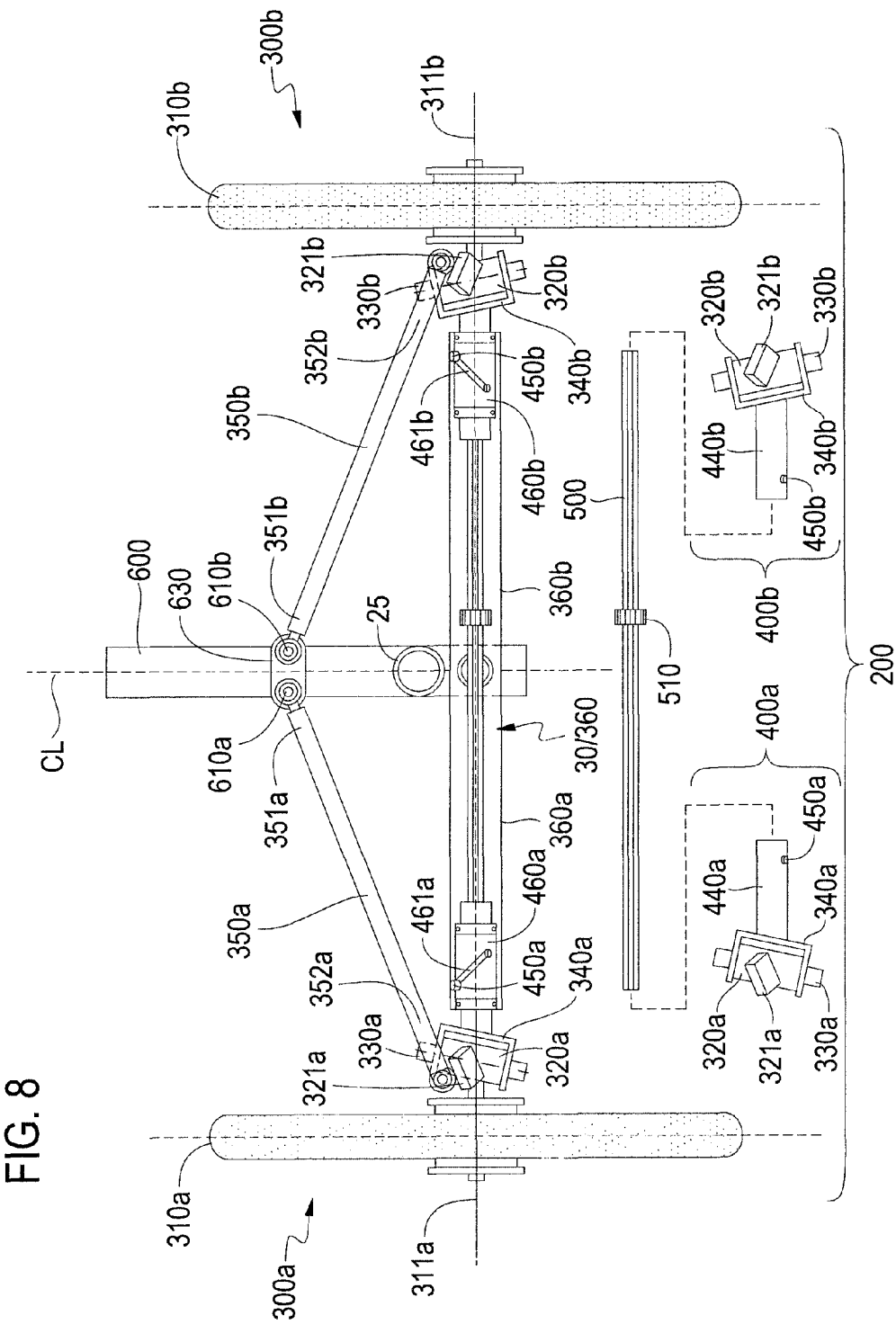
FIG. 8. A front view of an embodiment of the steering mechanism comprising a caster angle that is adjustable using a drive shaft.

In the embodiment illustrated in FIG. 8, the transverse member contains a splined drive shaft 500 that extends into the bracket mounts 400 at both ends. A pinion gear 510 on the drive shaft 500 can be rotated. As the drive shaft 500 is rotated the bracket mounts 400 rotate, adjusting the caster angle. The index pin 450 in the guide slot 461 causes the bracket mounts 400 to slide outward as the caster angle increases. The outward movement of the kingpins 330 in this embodiment permits a constant steering linkage length. The slight increase in track distance as caster angle increases provides additional stability during high speed turns.

Figure 9:
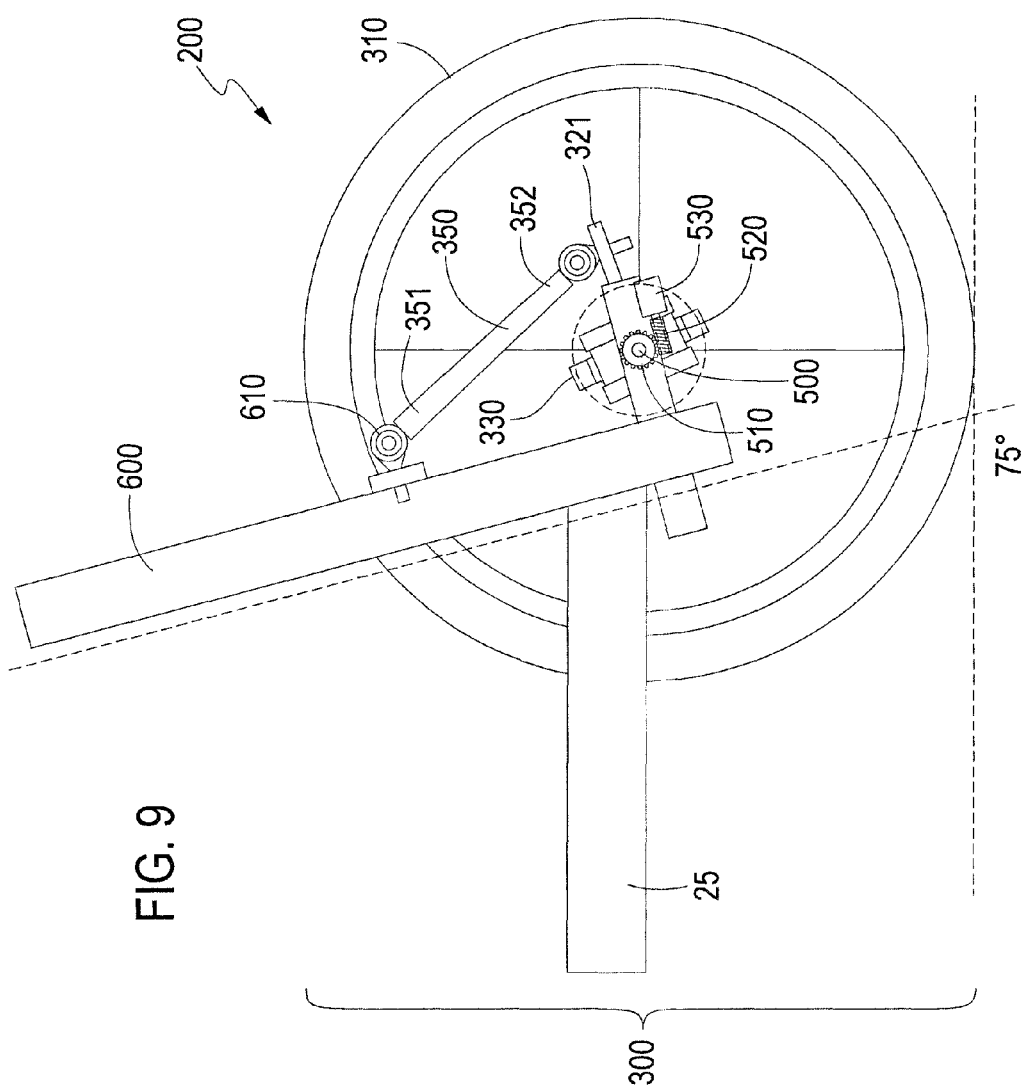
FIG. 9. A side view of an embodiment of the steering mechanism comprising a caster angle that is adjustable using a drive shaft, the drive shaft rotated by a stepper motor coupled to a worm gear in turn engaged to a pinion gear that is coaxial with the drive shaft.
Figure 10:
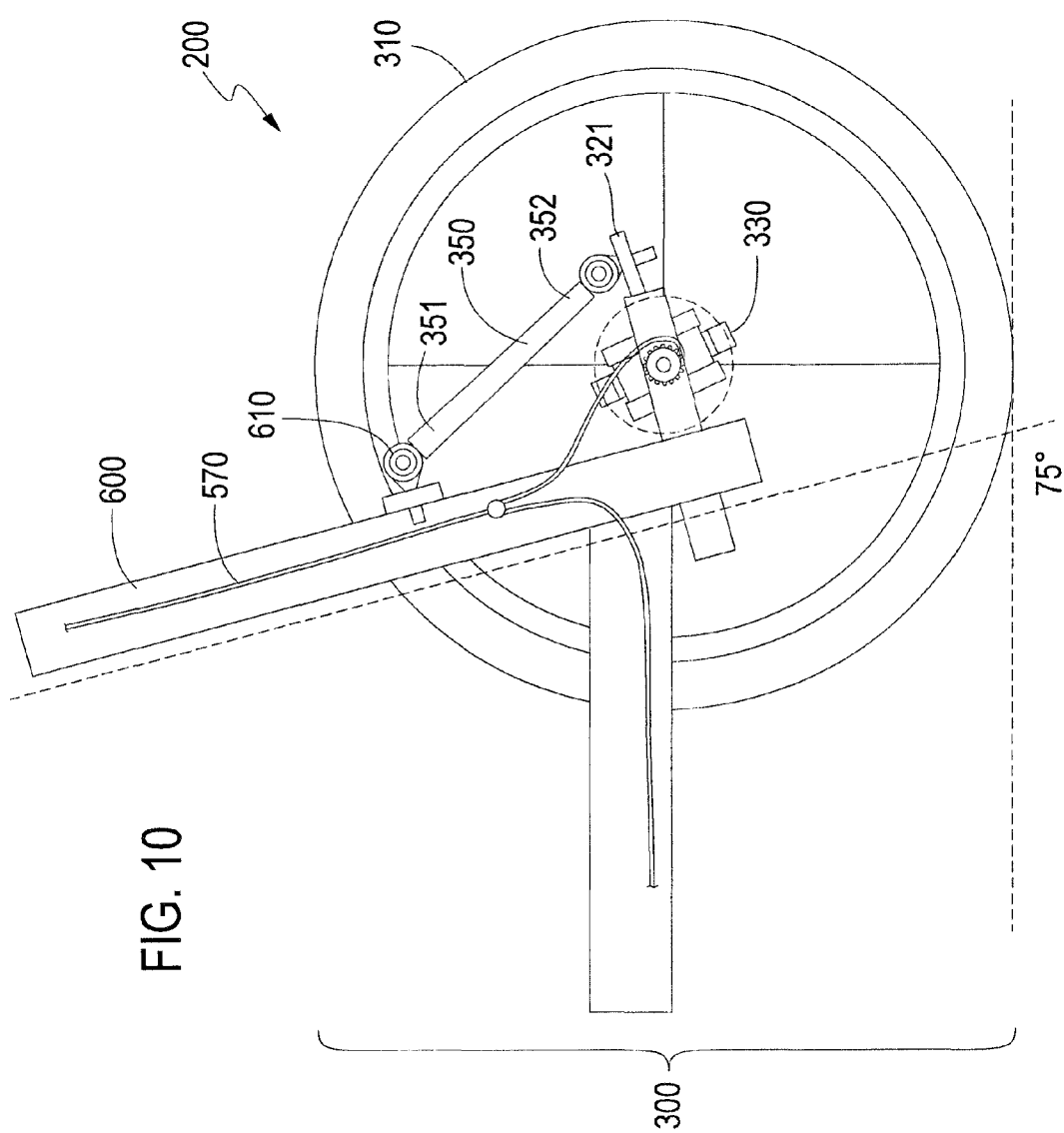
FIG. 10. A side view of an embodiment of the steering mechanism comprising a caster angle that is adjustable using a drive shaft, the drive shaft rotated by a shifter cable that is connected to a grip shifter manipulated by the vehicle operator.

The drive shaft 500 may be rotated by any suitable means known in the art. For example, as illustrated in FIGS. 9 and 10, some embodiments comprise a shifter cable 570 connected to the drive shaft 500 and a manual shifter connected to the shifter cable 570. The operator manipulates the manual shifter to change the caster angle as the operator deems necessary. The shifter cable 570 may be linked to a gear-shifter cable that is linked to a drive assembly 100. In some embodiments, as the rider shifts to higher gears to increase speed the caster angle increases simultaneously. Some versions provide spring tension on the drive shaft 500 such that when the rider shifts to lower gears the caster angle automatically decreases. Some embodiments of the drive shaft 500 comprise a co-axial pinion gear 510; when the pinion gear 510 is rotated, the drive shaft 500 also rotates. The pinion gear 510 may be engaged by a worm gear 520. The worm gear 520 may be rotated automatically or by an operator. Exemplary means by which the worm gear 520 may be rotated include an electric motor or a manually powered dowel. As illustrated in FIG. 9, some embodiments of the mechanism comprise a stepper motor 530 configured to rotate the worm gear 520 and a power source 540 electrically connected to the stepper motor 530. Since the drive shaft 500 only needs to rotate to cause a caster angle change, it could be driven by a low-power generator 542 (for example in one of the hubs) and a simple logic circuit 550. The power source 540 may be any reasonably portable power source. One example is a battery. Another example is a photovoltaic cell. Some embodiments of the power source 540 comprise a generator 542 configured to generate an electrical current from the rotation of at least one wheel 310. Of course, more than one source of power can be present; this is particularly true in the case of batteries, which may be present when another source of power is present, and used only when the other source of power is not available (for example, when the wheels 310 are not turning or when there is insufficient ambient light to power a photovoltaic cell). The battery may also be a rechargeable battery, in which case the battery may be electrically connected to the other power source such that the battery recharges when the other power source is generating power that is not needed by the stepper motor 530.

Figure 18:
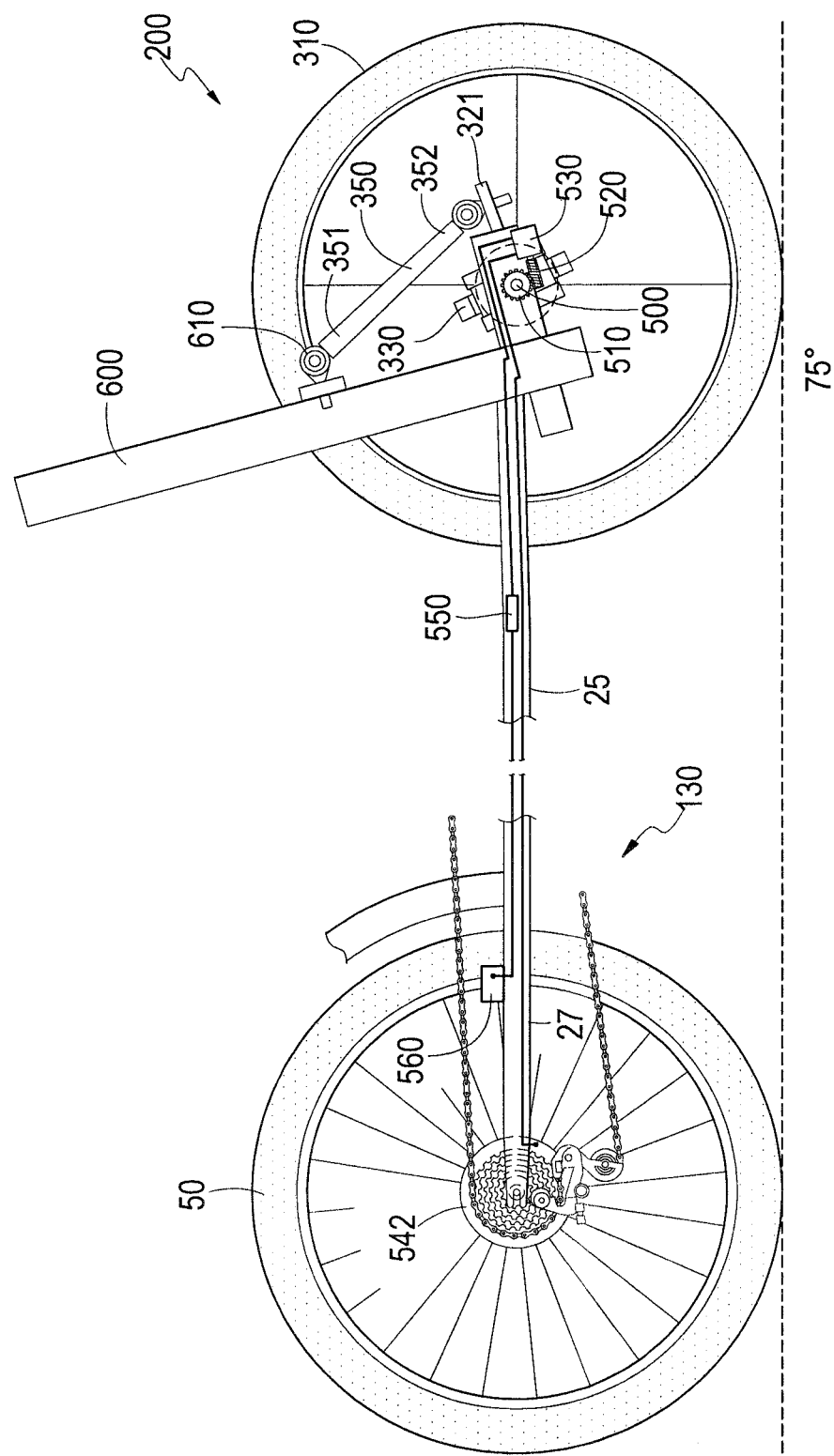
FIG. 18. A side view of an embodiment of the steering mechanism comprising a logic circuit controlling the stepper motor and a power source.

In some embodiments of the mechanism, such as the embodiment illustrated in FIG. 18, the caster angle changes automatically in response to some condition. One such exemplary condition is the speed of the vehicle 700. Some embodiments of the steering mechanism comprise a sensor capable of generating a signal and configured to provide the signal to the stepper motor 530. The sensor may be a wheel speed sensor 560, a tachometer, or a speedometer. In some embodiments a logic circuit 550 is configured to receive the signal from the sensor, transform the signal, and transmit the signal to the stepper motor 530. This allows more complex automatic control of the caster angle in response to the condition. For example, the sensor could signal the stepper motor 530 to increase the caster angle in response to increased wheel speed and decrease the caster angle in response to decreased wheel speed.

C. Vehicle

Figure 12:
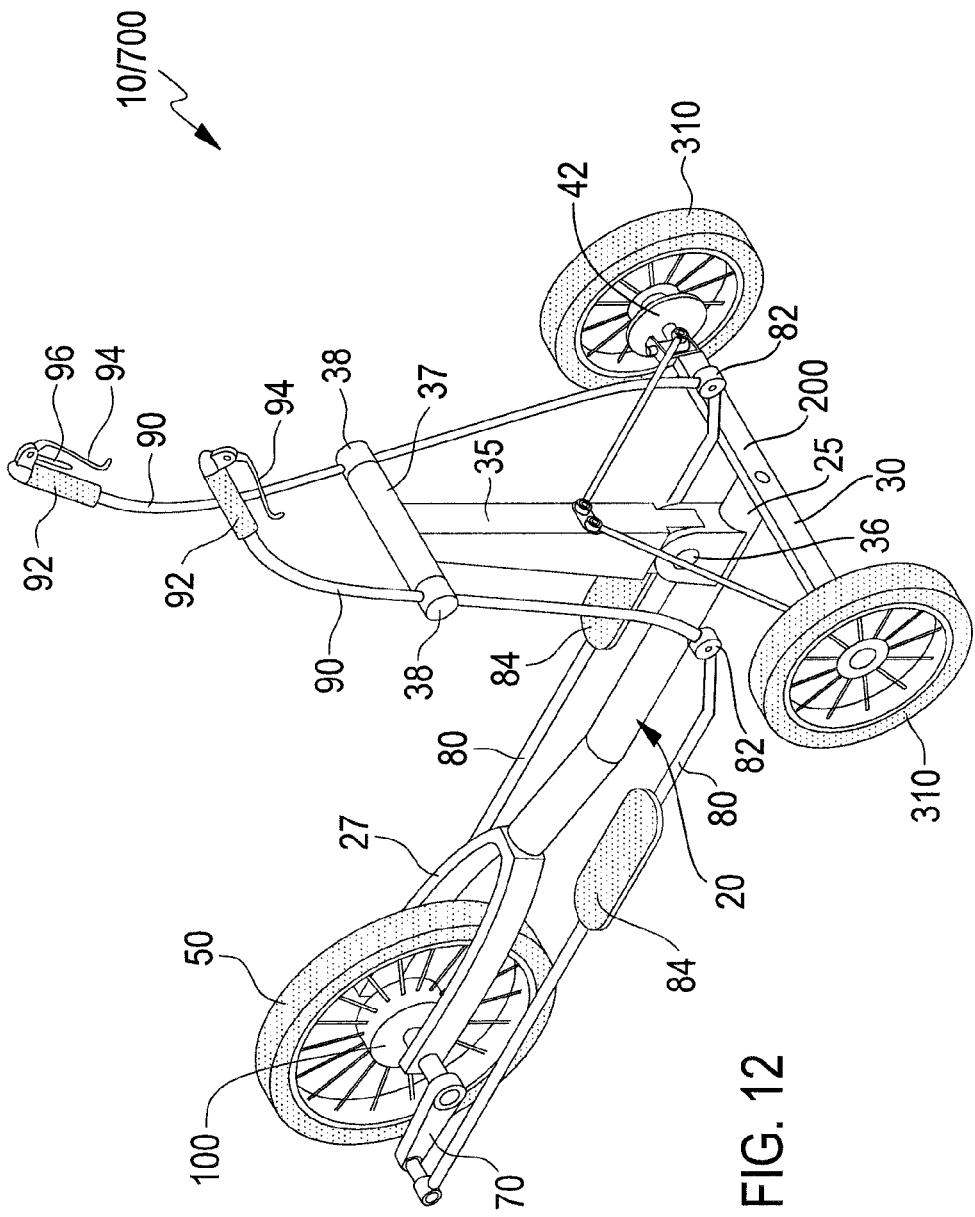
FIG. 12. A perspective view of an embodiment of the mobile device.

A wheeled vehicle 700 is provided, comprising any of the steering mechanisms described herein. An embodiment of the vehicle 700 is shown in FIG. 12. The vehicle 700 may be a lean-steered vehicle 700; in such embodiments an operator steers the vehicle 700 by leaning the upright member 600, causing the wheels 310 to toe and camber. In embodiments in which the vehicle 700 comprises more than two wheels 310, the wheels 310 of the steering mechanism may be a front set of wheels 310 or a rear set of wheels 310.

Some embodiments of the vehicle 700 comprise a transverse member 30 comprising the dextral support member 360a and the sinistral support member 360b, the axis of lean intersecting the track center point. In some such embodiments, the transverse member 30, the dextral support member 360a, and the sinistral support member 360b are a single structure. In these embodiments the transverse member 30 is the means of support of both the dextral and sinistral wheel assemblies 300.

Some embodiments of the vehicle 700, such as that illustrated in FIG. 12, are a lean-steered vehicle 700. Some embodiments of the lean-steered vehicle 700 are adapted to utilize ambulatory motion of the user's body for propulsion. Such embodiments of the vehicle 700 comprise: a frame 20 (the frame 20 comprising a longitudinal frame member 25 oriented substantially horizontally, having a front end and a rear end; a transverse frame member 30 oriented substantially horizontally, having two ends, the front end of the longitudinal member 25 joined to the transverse member 30 and capable of lean relative to the transverse member 30); any of the steering mechanisms disclosed herein, wherein the dextral support member 360a is the transverse frame member 30 and wherein the sinistral support member 360b is the transverse frame member 30, and wherein the upright member 600 is an upright frame member comprising a top end and a bottom end, the bottom end joined to the longitudinal member 25; a steering linkage bracket 630 fastened to the upright frame member 600, the steering linkage bracket 630 comprising a first dextral steering linkage attachment point 610a coupled to the inboard end 351a of the dextral steering linkage 350a and a first sinistral steering linkage attachment point 610b coupled to the inboard end 351b of the sinistral steering linkage 350b; a rear wheel 310 comprising a drive assembly 100 rotationally coupled to said longitudinal frame member 25; a pair of elongate striding members 80, adapted to receive the feet of said user and support said user while ambulating, positioned substantially horizontally along either side of said longitudinal frame member 25, having a front pivot end and a rearward drive end, the rearward drive end of each striding member coupled to said drive assembly 100; and a pair of upright arm levers 90 having an upper grip end 92 and a lower pivot end, the arm levers 90 pivotally coupled to the upright frame member 600 at a point between the upper and lower ends, the lower pivot end of each arm lever pivotally coupled to the front pivot end of one of said striding members 80. In some embodiments, the connection of said transverse frame member 30 and said longitudinal frame member 25 permits partial axial rotation of said longitudinal member 25, and the device further comprises a steering mechanism 200 coupled to each of the front wheels 310 and affixed to said longitudinal member 25, said steering mechanism 200 adapted to translate lean of said longitudinal member 25 into wheel toe and/or camber, thereby causing the device 10 to turn.

Embodiments of the vehicles 700 disclosed further comprise a drive assembly configured to translate the rotational motion of the inner end of at least one crank into rotational motion of the rear wheel on its axis of rotation.

Figure 13:
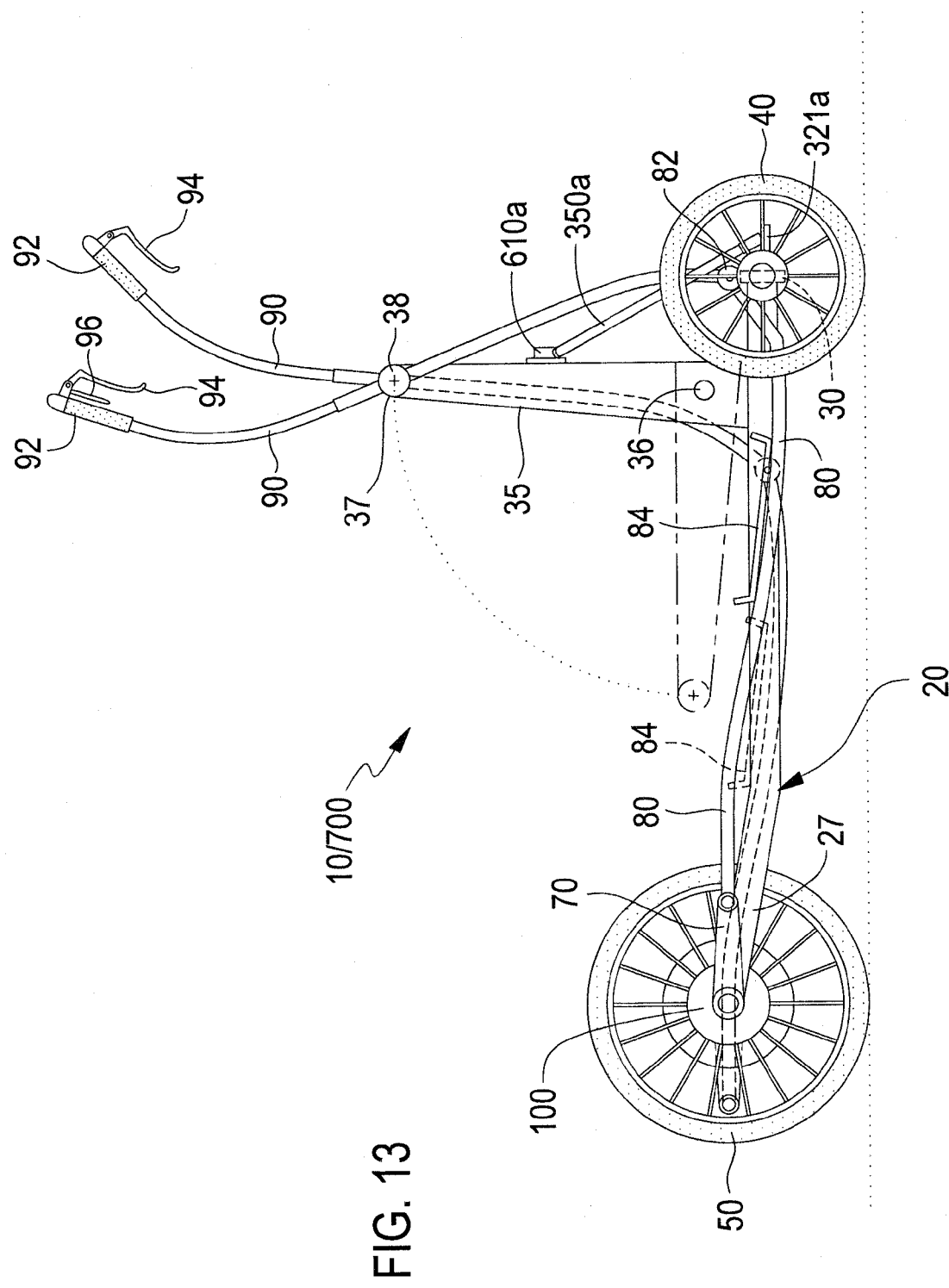
FIG. 13. A side view of the embodiment of the mobile device shown in FIG. 12.

As illustrated in FIGS. 12 and 13, in some embodiments of the vehicle 700 the rear wheel 50 comprises a drive assembly 100 rotationally coupled to the longitudinal frame member 25 proximate the rear end thereof, said drive assembly 100 comprising a rotating axle 110, a hub 105, and a gear system 120 internal to said hub 105 transferring rotation of said axle 110 to rotation of said hub 105 in a predetermined ratio of axle rotation to hub rotation.

Figure 16:
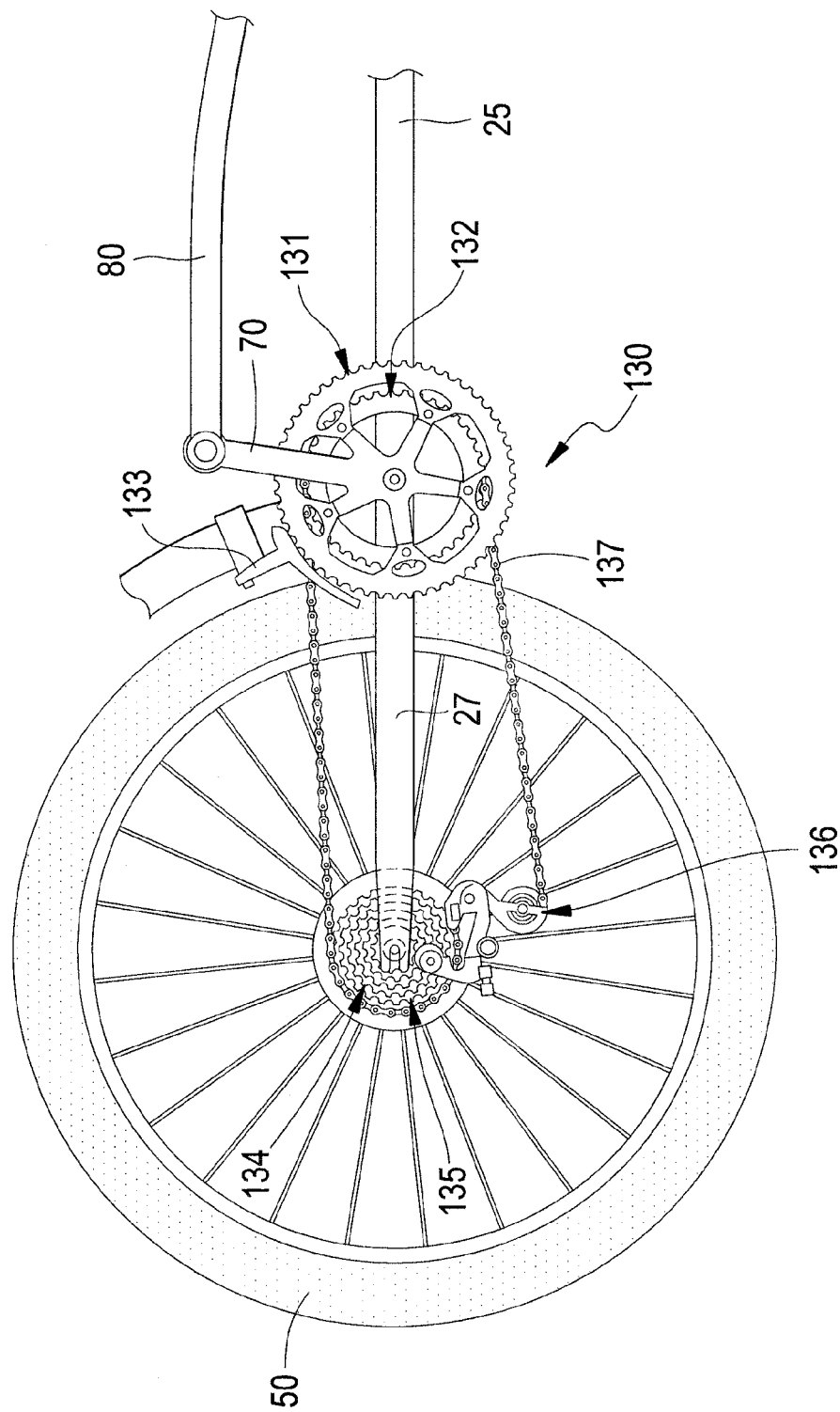
FIG. 16. A side view of an embodiment of the mobile device comprising a chain-and-sprocket drive assembly and fore-and-after derailleurs.
Figure 17:
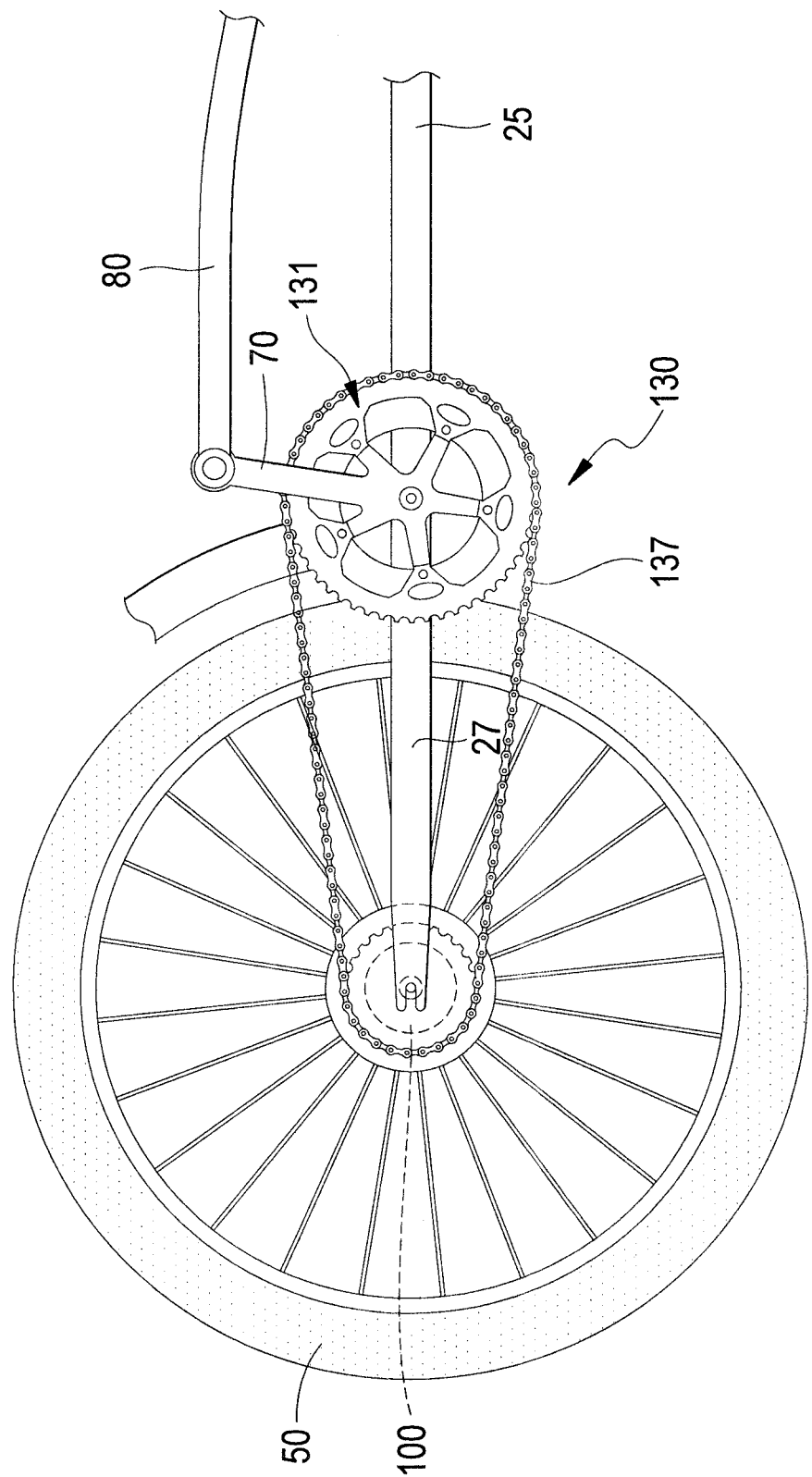
FIG. 17. A side view of an embodiment of the mobile device comprising a front chain ring engaged to a drive chain that imparts rotational motion to a rear internally-geared hub.

As illustrated in FIG. 16, some embodiments of the drive assembly comprise a chain-and-sprocket drive system 130. The chain-and-sprocket drive system 130 comprises a chain ring 131 that receives rotational motion from the inner end of at least one of the cranks 70, a drive chain 137 that is engaged to the chain ring 131, and a sprocket 134 that is engaged to the drive chain 137 and is configured to impart rotational motion to the rear wheel 50. The inner end of the crank 70 may share an axis of rotation with the chain ring 131, in which case the inner end of the crank 70 may impart rotational motion to the forward sprocket 131 by means of a shared axle. Alternatively, the forward sprocket 131 need not share the axis of rotation with the inner end of the crank 70, but may receive rotational motion from the inner end of the crank 70 by some intervening mechanism, such as a mutually shared gear or network of gears. Some embodiments of the mechanism may comprise an additional chain ring 132 or a plurality of chain rings. In some such embodiments the drive chain 137 may alternate in terms of which chain ring 132, 137 it engages, for example by means of a forward derailleur 133. Similarly, the sprocket 134 may share an axis of rotation with the rear wheel 50, in which case the sprocket 134 may impart rotational motion to the rear wheel 50 by means of a shared axle. Alternatively, the sprocket 134 need not share the axis of rotation with the rear wheel 50, but may impart rotational motion to the rear wheel 50 by some intervening mechanism, such as a mutually shared gear or network of gears. Some embodiments of the mechanism may comprise a drive chain and rear sprocket connected to a rear hub with a plurality of internal gears to provide multiple drive ratios selectable by the user. Other embodiments may comprise a drive chain and rear hub with an external plurality of sprockets to provide multiple drive ratios which are user selectable by means of a rear derailleur 136.

Some embodiments of the vehicle 700 are a mobile elliptical device. As shown in FIG. 12, one embodiment of the mobile elliptically driven device 10 (hereinafter referred to as the elliptical traveler) of the present invention comprises a frame 20, front wheel 310, a rear wheel 50, a pair of striding members 80, and arm members 90.

The frame 20 comprises a longitudinal, substantially horizontal frame member 25, a transverse, substantially horizontal frame member 30, and an upright frame member 600. The transverse frame member 30 is joined to the front end of longitudinal frame member 25. These components may be fixedly joined, or they may joined together in such a way as to allow the longitudinal frame member 25 to rotate axially a fixed amount within transverse frame member 30 to effect wheel camber for steering, as hereinafter described.

The upright frame member 600 is mounted to the longitudinal frame member 25 such that it extends in a substantially upright manner from the longitudinal frame member 25. The upright frame member 600 is shown mounted in FIG. 12 in a substantially normal orientation, although it could be angled forwards or rearwards as might suit a particular design or application. Moreover, the upright frame member 600 may be mounted to the longitudinal member 25 via an adjustable joint 36, which may be tightened to fix upright frame member 35 in a desired position, and which also allows upright frame member to fold down, or collapse, to flatten the entire device for storage as shown in FIG. 13. The longitudinal frame member may include a rear fork 27, in which the rear wheel 50 is mounted. Alternatively, the rear of longitudinal frame member 25 may comprise a single arm to which the rear wheel 50 is mounted. This single arm may be offset axially from the primary portion of the longitudinal frame member to allow the rear wheel 50 to be centered under the rider (which is not necessary because this embodiment is self-standing, independent of whether the radial plane of the rear wheel 50 is coplanar with the longitudinal axis of frame member 25). The front wheels 310 are mounted on either end of the transverse frame member 30 via appropriate rotary couplings known in the art.

Along either side of longitudinal frame member 25 is a striding member 80. The rear or drive ends of the striding members are rotationally coupled in any conventional manner to a drive assembly 100 of the rear wheel 50 (described in detail below), such as by one of a pair of opposing cranks 70 (each opposing crank 70 having an inner end and an outer end). Each striding member may include a footbed 84 to provide a stable platform for the rider's feet. The front or pivot end of each striding member is pivotally connected to the bottom end of one of a pair of reciprocating arm members 90, each of which extends upwards generally alongside the upright frame member 35 and terminates in a grip end 92. The upright frame member includes a crossbar 37, which includes a rotational coupling 38 on either end. Each arm member 90 is fixed to one of the rotational couplings 38.

When the rider applies force to the striding members to put them in motion, the rear end of each striding member 80, rotationally attached to crank 70, follows a circular path concentric with the rear wheel 50, while the front end of striding member 80 (defined by pivot joint 82) reciprocates in a substantially horizontal arcuate path. This action results in the footbed 84 tracing an elliptical path, and, more particularly, an asymmetrical ellipse with the arc of the front of the ellipse being smaller than that of the back (i.e., egg-shaped). The lower end of each arm member 90, attached to pivot joint 82, moves in conjunction therewith, while the grip end 92 also reciprocates through an arcuate path. Thus as may be seen from FIG. 12 in conjunction with the foregoing description, a rider may propel the elliptical traveler 10 forward by applying alternating force to the grip end 92 of each arm member 90 while striding with the legs and feet in a natural elliptical path on footbeds 84.

In certain embodiments, striding member 80 includes a notched cam cut 85. Footbed 84 includes a cam follower 86 with a tightening means (e.g., a nut and bolt, or screw) such that the rider may select the desired position of footbed 84 by sliding it along the cam cut 85 and tightening cam follower 86 in the desired notch. By altering the position of footbed 84, the rider alters, in the vertical dimension, the shape of the elliptical path traced by his feet as he rides traveler 10, and thus the rider may adjust the amount of leg lift utilized in each stride.

As noted, each arm member 90 terminates at its upper end in a grip end 92. The upper ends of arm members 90 may be adjustable in length to alter the length of travel of the grip ends 92.

Each grip end 92 includes a brake lever 94. One brake lever 94 operates the front brakes 42 via a cable routed between the brake lever and front brakes. The other brake lever 94 operates the rear brake 52, via a cable routed between the brake lever and rear brake. The cables may be routed internal the arm members and frame components, or externally, or a combination thereof as desired, utilizing cable housing where necessary as known in the art. Disc brakes are shown, although other conventional braking mechanisms known in the art (such as a Y or caliper brake for the rear wheel 50) may be utilized.

Figure 14:
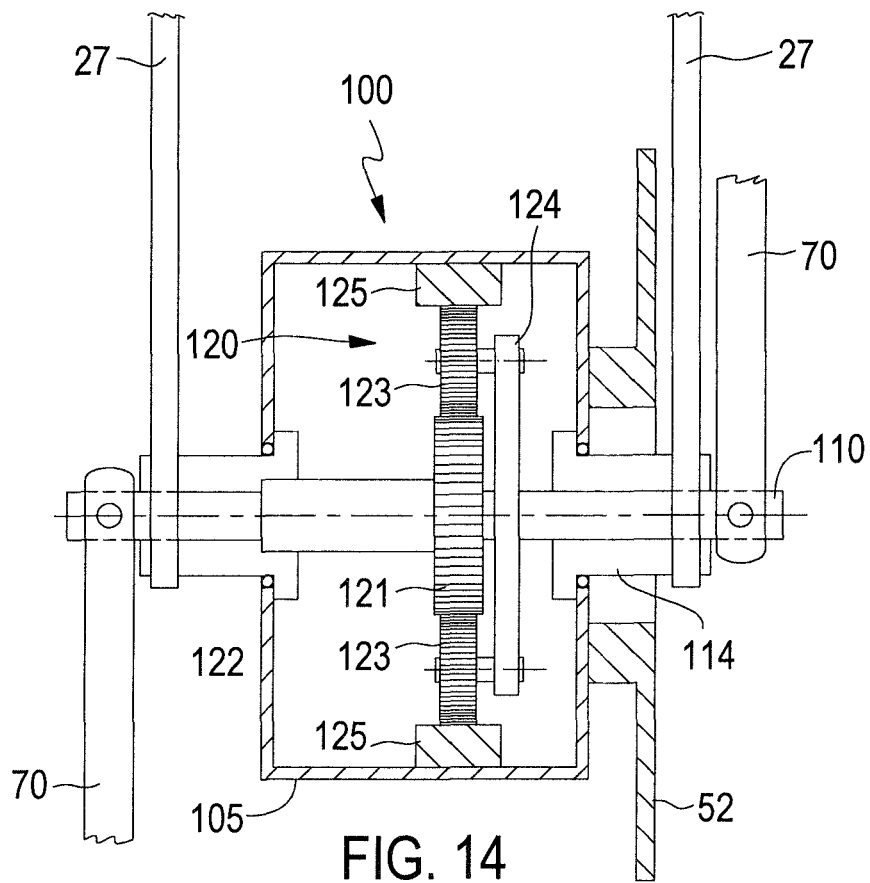
FIG. 14. A top sectional view of an exemplary drive assembly.

One embodiment of the drive assembly 100 is shown in FIG. 14. The drive assembly 100 comprises a hub body 105, an axle 110, and an internal gear system 120. The hub body 105 is connected mechanically to the rim of the rear wheel 50, via spokes or other traditional mechanical means (e.g., a metallic wheel body, a composite disc, etc.). Also, the disc of rear brake 52 is shown as attached to the hub body 105.

One of the pair of opposing cranks 70 is attached to either end of the axle 110 via any conventional mechanical attachment means. Note that one or both of the attachment means between the crank 70 and the axle 110 could be releasable, such that with the attachment released one crank 70 could be rotated into alignment with the other crank 70 to allow the traveler 10 to be folded into the smallest possible size when the upright frame member 600 is collapsed, as described above. Each opposing crank 70 has an inner end and an outer end.

The axle 110 extends through the rear end of each arm of the fork 27, through the axis of the hub body 105, and through the sun gear arm 122 described below. Free rotation of the crank within the fork 27, hub body 105, and sun gear arm 122 is permitted by fork bearings 112, hub bearings 114, and sun gear arm bearings (not shown).

Figure 15:
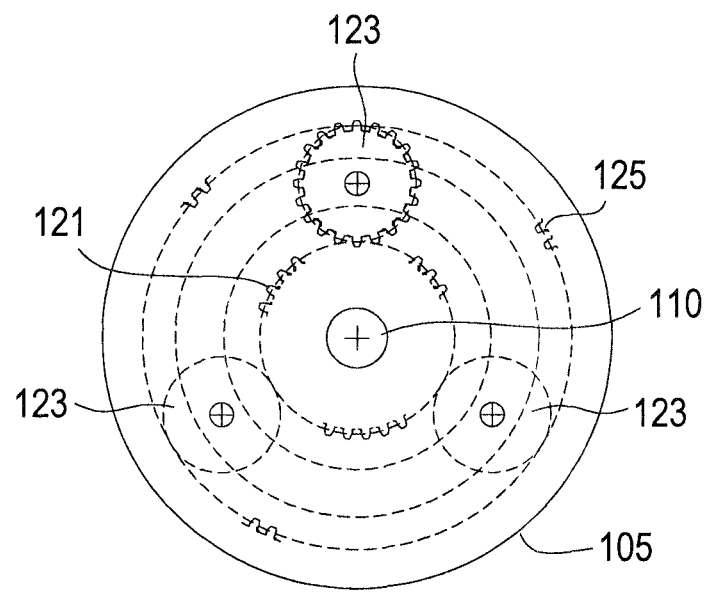
FIG. 15. A schematic view of an exemplary internal gear system.

The internal gear system 120 is located inside the hub body 105. Note that the internal gear system 120 shown in FIGS. 14-15 is illustrative only; any internal gearing system utilizing a rotating axle known in the art, or hereinafter developed, could be used and employed. The internal gear system 120 is shown for illustration purposes to be a planetary gear system. A central or sun gear 121 is held in a fixed (non-rotating) position by sun gear arm 122, which connects the sun gear 121 to the frame. Planetary gears 123 rotate about sun gear 121. The planetary gears in turn contact a complementary ring gear 125 on the inside surface of hub body 105. The planetary gears are mounted to planetary gear carrier 124, which is fixedly attached to the axle 110.

As the rider applies force to the striding members 80 and arm members 90, thereby rotating the cranks 70 and axle 110, rotary motion is imparted to the hub body 105 via internal gear system 120. The ratio between the rotation of the axle and rotation of the rear wheel 50 can be altered by altering the gear ratio between the planetary and sun gears, as is known in the art.

Internal gear system 120 is shown as a single-gear system for simplicity. Those skilled in the art will recognize that multiple gear ratios can be achieved by providing additional planetary gear combinations that may be switched in and out between the sun gear 121 and the ring gear 125 on the inside surface of hub body 105. Such gearing systems, called compound planetary gear systems, typically utilize the variable tension of a cable in combination with a spring to switch the active gear. For this reason, as shown in FIGS. 12 and 13, one grip end 92 additionally includes a shift lever 96, from which a cable (not shown) is routed either internally within the frame or externally alongside it to the internal gear system, as is known in the art. Likewise, manufacturers of internal gear hubs are beginning to use electrically driven shift systems. Any such shifting system known in the art or hereinafter developed could be used in this embodiment of the present invention.

Methods

A method of steering a vehicle 700 is provided, comprising imparting motion to the upright member 600 of any of the steering mechanisms 200 disclosed so as to cause the steering arms 321 to swivel the steering knuckle 320. The steering mechanism 200 may be a component of the vehicle 700, such as (but not limited to) any of the vehicles 700 disclosed herein.

D. Conclusions

The foregoing description illustrates and describes the processes, machines, manufactures, compositions of matter and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and knowledge of a person having ordinary skill in the relevant art. The embodiments described above are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein.

We claim:

1. A steering mechanism capable of altering the toe angle in conjunction with camber angle of a wheel, the mechanism comprising a wheel assembly and an upright member configured to lean relative to the wheel assembly, the wheel assembly comprising:
   (a) a wheel;
   (b) a steering knuckle fastened to the wheel comprising a steering arm;
   (c) a kingpin positioned within the steering knuckle such that the steering knuckle is free to swivel about the swivel axis of the kingpin;
   (d) a kingpin bracket bracketing the kingpin;
   (e) a steering linkage having an inboard end and an outboard end, the outboard end fastened to the steering arm in a configuration to control the degree of swivel of the steering knuckle about the swivel axis, the inboard end fastened to the upright member at a first attachment point;
   (f) a support member supportingly fastened to the kingpin bracket;
wherein the wheel has an axis of rotation, a toe angle, and a caster angle; wherein the kingpin has a caster angle, a swivel axis, and a kingpin inclination; and wherein the intersection of the axis of rotation of the wheel and the swivel axis of the kingpin define a caster point;
   wherein the wheel assembly is a dextral wheel assembly, the wheel is a dextral wheel, the steering knuckle is a dextral steering knuckle, the steering arm is a dextral steering arm, the kingpin is a dextral kingpin, the kingpin bracket is a dextral kingpin bracket, the steering linkage is a dextral steering linkage, the first attachment point is a first dextral attachment point, the support member is a dextral support member, and the caster point is a dextral caster point; further comprising a sinistral wheel assembly, the sinistral wheel assembly comprising:
   (g) a sinistral wheel;
   (h) a sinistral steering knuckle fastened to the sinistral wheel comprising a sinistral steering arm;
   (i) a sinistral kingpin positioned within the sinistral steering knuckle such that the sinistral steering knuckle is free to swivel about the sinistral kingpin's swivel axis;
   (j) a sinistral kingpin bracket bracketing the sinistral kingpin;
   (k) a sinistral steering linkage having an inboard end and an outboard end, the outboard end fastened to the sinistral steering arm in a configuration to control the degree of swivel of the sinistral steering knuckle about the swivel axis, the inboard end fastened to the upright member at a first sinistral attachment point;
   (l) a sinistral support member supportingly fastened to the sinistral kingpin bracket;
wherein the sinistral wheel has an axis of rotation, a toe angle, and a camber angle;
wherein the sinistral kingpin has a caster angle and a kingpin inclination; and wherein the intersection of the axis of rotation of the sinistral wheel and the swivel axis of the sinistral kingpin defines a sinistral caster point.

2. The steering mechanism of claim 1,
   (a) wherein a line intersecting the dextral caster point and the sinistral caster point defines a track line comprising a track center point equidistant from the dextral caster point and the sinistral caster point, a track distance from the dextral caster point to the sinistral caster point, a right track distance from the dextral caster point to the track center point, and a left track distance from the sinistral caster point to the track center point; and
   (b) configured such that the caster angle of the dextral kingpin may be adjusted by rotating the dextral kingpin bracket about the track line, and the caster angle of the sinistral kingpin may be adjusted by rotating the sinistral kingpin bracket about the track line.

3. The steering mechanism of claim 2, wherein the dextral kingpin bracket is movably supported by the dextral supporting member such that the right track distance may be adjusted and wherein the sinistral kingpin bracket is movably supported by the sinistral supporting member such that the left track distance may be adjusted.

4. The steering mechanism of claim 3, further comprising:
(a) a dextral bracket mount fastened to the dextral kingpin bracket and movably supported by the dextral supporting member;
(b) a dextral bracket mount lock positioned to allow the dextral bracket mount to be reversibly locked into place relative to the dextral supporting member;
(c) a sinistral bracket mount fastened to the sinistral kingpin bracket and movably supported by the sinistral supporting member; and
(d) a sinistral bracket mount lock positioned to allow the sinistral bracket mount to be reversibly locked into place relative to the sinistral supporting member.

5. The steering mechanism of claim 4, wherein:
(a) the dextral bracket mount comprises a splined rod positioned within a dextral splined shaft;
(b) the dextral supporting member comprises the dextral splined shaft;
(c) the dextral bracket mount lock comprises a clamping screw;
(d) the sinistral bracket mount comprises a splined rod positioned within a sinistral splined shaft;
(e) the sinistral supporting member comprises the sinistral splined shaft; and
(f) the sinistral bracket mount lock comprises a clamping screw.

6. The steering mechanism of claim 3, further comprising:
(a) a dextral bracket mount fastened to the dextral kingpin bracket, the dextral bracket mount comprising a circular housing and a dextral index pin;
(b) a dextral guide sheath comprising a guide slot defining the movement of the dextral index pin such that castor angle increases as the right track distance increases;
(c) a sinistral bracket mount fastened to the sinistral kingpin bracket, the sinistral bracket mount comprising a circular housing and a sinistral index pin;
(d) a sinistral guide sheath comprising a guide slot defining the movement of the sinistral index pin such that castor angle increases as the left track distance increases; and
(e) a drive shaft fastened to at least one of: the dextral bracket mount to provide rotation to the dextral bracket mount about the track line, and the sinistral bracket mount to provide rotation to the sinistral bracket mount about the track line.

7. The steering mechanism of claim 6, wherein the drive shaft comprises a coaxial pinion gear.

8. The steering mechanism of claim 7, further comprising a worm gear engaged to the pinion gear.

9. The steering mechanism of claim 8, wherein the rotation of the worm gear is controlled by an operator.

10. The steering mechanism of claim 8, further comprising:
(a) a stepper motor configured to rotate the worm gear; and
(b) a power source electrically connected to the stepper motor.

11. The steering mechanism of claim 10, wherein the power source is a generator configured to generate an electrical current from the rotation of at least one of the dextral wheel, the sinistral wheel, or another wheel.

12. The steering mechanism of claim 10, further comprising a wheel speed sensor capable of generating a signal and configured to provide the signal to the stepper motor, such that the caster angle of at least one of the dextral wheel and the sinistral wheel is varied with wheel speed.

13. The steering mechanism of claim 12, further comprising a logic circuit configured to receive the signal from the wheel speed sensor, transform the signal, and transmit the signal to the stepper motor.

14. The steering mechanism of claim 6, further comprising a shifter cable connected to the drive shaft and a manual shifter connected to the shifter cable.

15. A wheeled vehicle comprising the steering mechanism of claim 1.

16. The wheeled vehicle of claim 15, wherein the vehicle is a lean-steered vehicle, wherein the upright member further comprises a steering linkage bracket comprising the first dextral steering linkage attachment point and the first sinistral steering linkage attachment point.

17. The lean-steered vehicle of claim 16, further comprising a transverse member comprising the dextral support member and the sinistral support member, the axis of lean intersecting the track center point.

18. The lean-steered vehicle of claim 17, wherein the caster angle of the dextral kingpin may be adjusted by rotating the dextral kingpin bracket about the track line, and the caster angle of the sinistral kingpin may be adjusted by rotating the sinistral kingpin bracket about the track line.

19. A lean-steered vehicle adapted to utilize ambulatory motion of the user's body for propulsion comprising:
(a) a frame comprising:
(i) a longitudinal frame member oriented substantially horizontally, having a front end and a rear end;
(ii) a transverse frame member oriented substantially horizontally, having two ends, the front end of the longitudinal member joined to the transverse member and configured to lean relative to the transverse member;
(b) the steering mechanism of claim 1, wherein the dextral support member is the transverse frame member and wherein the sinistral support member is the transverse frame member, and wherein the upright member is an upright frame member comprising a top end and a bottom end, the bottom end joined to the longitudinal member at a position rearward of the transverse member;
(c) a steering linkage bracket fastened to the upright frame member, the steering linkage bracket comprising a first dextral steering linkage attachment point coupled to the inboard end of the dextral steering linkage and a first sinistral steering linkage attachment point coupled to the inboard end of the sinistral steering linkage;
(d) a rear wheel comprising a drive assembly rotationally coupled to said longitudinal frame member;
(e) a pair of elongate striding members, adapted to receive the feet of said user and support said user while ambulating, positioned substantially horizontally along either side of said longitudinal frame member, having a front pivot end and a rearward drive end, the rearward drive end of each striding member coupled to said drive assembly; and
(f) a pair of upright arm levers having an upper grip end and a lower pivot end, said arm levers pivotally coupled to said upright frame member at a point between said ends, the lower pivot end of each said lever pivotally coupled to the front pivot end of one of said striding members.

20. The lean-steered vehicle of claim 19,
(a) wherein the line intersecting the dextral caster point and the sinistral caster point defines a track line comprising a track center point equidistant from the dextral caster point and the sinistral caster point, a track distance from the dextral caster point to the sinistral caster point, a right track distance from the dextral caster point to the track center point, and a left track distance from the sinistral caster point to the track center point; and
(b) wherein the caster angle of the dextral kingpin may be adjusted by rotating the dextral kingpin bracket about the track line, and the caster angle of the sinistral kingpin may be adjusted by rotating the sinistral kingpin bracket about the track line.

21. The lean-steered vehicle of claim 19, wherein the drive assembly is selected from the group consisting of:
(a) a chain-and-sprocket drive assembly comprising a chain ring that receives rotational motion from the rearward drive end of at least one striding member, a drive chain that is engaged to the chain ring, and a sprocket that is engaged to the drive chain and is configured to impart rotational motion to the rear wheel; and
(b) an internally geared hub drive assembly, comprising a hub body, an axle, and an internal gear system.

22. A mobile device adapted to utilize ambulatory motion of the user's body for propulsion comprising:
(a) a frame having a front end and a rear end;
(b) a front wheel and a rear wheel, the rear wheel comprising a drive assembly, the front wheel rotationally coupled to said frame approximate the front end of the frame, and the rear wheel rotationally coupled to said frame via said drive assembly;
(c) a pair of elongate striding members, adapted to receive the feet of said user and support said user while ambulating, with a rear drive end and a front pivot end, the rear drive end of each of said striding members rotationally coupled to said drive assembly, such that the drive end of said striding members when rotated traces a path concentric with said rear wheel;
(d) a pair of upright arm members having an upper grip end and a lower pivot end, the lower pivot end of each of said arm members pivotally coupled to the pivot end of one of said striding members and wherein each said upright arm member is pivotally coupled to said frame at a point intermediate the ends of each said arm member; and
(e) the steering mechanism of claim 2, wherein the upright member is configured to lean relative to the frame.

23. The mobile device of claim 22,
(a) wherein the line intersecting the dextral caster point and the sinistral caster point defines a track line comprising a track center point equidistant from the dextral caster point and the sinistral caster point, a track distance from the dextral caster point to the sinistral caster point, a right track distance from the dextral caster point to the track center point, and a left track distance from the sinistral caster point to the track center point; and
(b) wherein the caster angle of the dextral kingpin may be adjusted by rotating the dextral kingpin bracket about the track line, and the caster angle of the sinistral kingpin may be adjusted by rotating the sinistral kingpin bracket about the track line.

24. A mobile device adapted to utilize ambulatory motion of the user's body for propulsion comprising:
(a) a frame with a front end and a rear end;
(b) the steering mechanism of claim 1 coupled to said frame, wherein the sinistral wheel is a front wheel, and wherein the dextral wheel is a front wheel, said mechanism adapted to allow said ambulatory user to translate a lateral shift in said user's body weight into pivotal motion of the steering knuckle about the kingpin's swivel axis, thereby causing said device to turn;
(c) a rear wheel comprising a drive assembly rotationally coupled to said frame proximate the rear end thereof;
(d) a pair of opposing cranks, each crank having an inner end and an outer end, the inner end fixedly attached to said drive assembly;
(e) a pair of elongate striding members, adapted to receive the feet of said user and support said user while ambulating, positioned substantially horizontally along either side of said frame, having a front pivot end and a rearward drive end, the rearward drive end of each striding member rotationally coupled to the outer end of one of said cranks; and
(f) a pair of upright arm levers having an upper grip end and a lower pivot end, said arm levers pivotally coupled to said frame at a point between said ends, the lower pivot end of each said lever pivotally coupled to the front pivot end of one of said striding members.

25. A method of steering a vehicle, comprising imparting motion to the upright member of the steering mechanism of claim 1 so as to cause the steering arms to swivel the steering knuckle.

26. A steering mechanism capable of altering the toe angle in conjunction with camber angle of a wheel, the mechanism comprising:
(a) an upright member;
(b) a dextral wheel assembly comprising
(i) a dextral wheel having an axis of rotation, a toe angle, and a camber angle;
(ii) a dextral steering knuckle fastened to the dextral wheel comprising a dextral steering arm;
(iii) a dextral kingpin having a swivel axis, a caster angle, and a kingpin inclination, the dextral kingpin positioned within the dextral steering knuckle such that the dextral steering knuckle is free to swivel about the swivel axis;
(iv) a dextral kingpin bracket bracketing the dextral kingpin;
(v) a dextral steering linkage having an inboard end and an outboard end, the outboard end fastened to the dextral steering arm in a configuration to control the degree of swivel of the dextral steering knuckle about the swivel axis, the inboard end fastened to the upright member at a first dextral attachment point;
(vi) a dextral support member supportingly fastened to the dextral kingpin bracket; and
(vii) a dextral caster point that is the intersection of the axis of rotation of the dextral wheel and the swivel axis of the dextral kingpin;
(c) a sinistral wheel assembly comprising
(i) a sinistral wheel having an axis of rotation, a toe angle, and a camber angle;
(ii) a sinistral steering knuckle fastened to the sinistral wheel comprising a sinistral steering arm;
(iii) a sinistral kingpin having a swivel axis, a caster angle, and a kingpin inclination, the sinistral kingpin positioned within the sinistral steering knuckle such that the sinistral steering knuckle is free to swivel about the swivel axis;
(iv) a sinistral kingpin bracket bracketing the sinistral kingpin;
(v) a sinistral steering linkage having an inboard end and an outboard end, the outboard end fastened to the sinistral steering arm in a configuration to control the degree of swivel of the sinistral steering knuckle about the swivel axis, the inboard end fastened to the upright member at a first sinistral attachment point;
(vi) a sinistral support member supportingly fastened to the sinistral kingpin bracket; and
(vii) a sinistral caster point that is the intersection of the axis of rotation of the wheel and the swivel axis of the kingpin; and
(d) an imaginary track line intersecting the dextral caster point and the sinistral caster point, the track line comprising a track center point equidistant from the dextral caster point and the sinistral caster point, a track distance from the dextral caster point to the sinistral caster point, a right track distance from the dextral caster point to the track center point, and a left track distance from the sinistral caster point to the track center point;
(e) wherein the dextral wheel has an axis of rotation, a toe angle, and a camber angle; wherein the dextral kingpin has a caster angle and a kingpin inclination;
(f) wherein the sinistral wheel has an axis of rotation, a toe angle, and a camber angle; wherein the sinistral kingpin has a caster angle and a kingpin inclination;
(g) wherein the intersection of the axis of rotation of the sinistral wheel and the swivel axis of the sinistral kingpin defines a sinistral caster point;
(h) wherein the intersection of the axis of rotation of the sinistral wheel and the swivel axis of the sinistral kingpin defines a sinistral caster point;
(i) wherein the line intersecting the dextral caster point and the sinistral caster point defines a track line comprising a track center point equidistant from the dextral caster point and the sinistral caster point, a track distance from the dextral caster point to the sinistral caster point, a right track distance from the dextral caster point to the track center point, and a left track distance from the sinistral caster point to the track center point; and wherein the steering mechanism is configured such that the caster angle of the dextral kingpin may be adjusted by rotating the dextral kingpin bracket about the track line, and the caster angle of the sinistral kingpin may be adjusted by rotating the sinistral kingpin bracket about the track line; and wherein the dextral kingpin bracket is movably supported by the dextral supporting member such that the right track distance may be adjusted and wherein the sinistral kingpin bracket is movably supported by the sinistral supporting member such that the left track distance may be adjusted.

* * * * *